United States Patent
Kim et al.

(10) Patent No.: US 10,839,239 B2
(45) Date of Patent: *Nov. 17, 2020

(54) ELECTRONIC DEVICE AND METHOD FOR IDENTIFYING FALSIFICATION OF BIOMETRIC INFORMATION

(71) Applicant: Samsung Electronics Co., Ltd., Gyeonggi-do (KR)

(72) Inventors: Suna Kim, Gyeonggi-do (KR); Kemsuk Seo, Gyeonggi-do (KR); Kyunghoon Song, Gyeonggi-do (KR); Bongjae Rhee, Gyeonggi-do (KR); Yunjang Jin, Gyeonggi-do (KR); Seyoung Jang, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,583

(22) Filed: Jun. 25, 2020

(65) Prior Publication Data

US 2020/0327348 A1 Oct. 15, 2020

Related U.S. Application Data

(63) Continuation of application No. 15/924,813, filed on Mar. 19, 2018, now Pat. No. 10,713,512.

(30) Foreign Application Priority Data

Mar. 20, 2017 (KR) ........................ 10-2017-0034966

(51) Int. Cl.
*G06K 9/00* (2006.01)

(52) U.S. Cl.
CPC ....... *G06K 9/00899* (2013.01); *G06K 9/0004* (2013.01); *G06K 9/00013* (2013.01)

(58) Field of Classification Search
CPC ............. G06K 9/0004; G06K 9/00013; G06K 9/0002; G06F 21/32; G06F 3/0412
(Continued)

(56) References Cited

U.S. PATENT DOCUMENTS 7,072,523 B2 * 7/2006 Bolle ................. G06K 9/00067
382/124
8,988,350 B2 * 3/2015 Karmarkar ............ G06F 21/316
345/158

(Continued)

FOREIGN PATENT DOCUMENTS

JP 2006-215975 A 8/2006
JP 2008-022973 A 2/2008
(Continued)

*Primary Examiner* — Charlotte M Baker
(74) *Attorney, Agent, or Firm* — Cha & Reiter, LLC.

(57) ABSTRACT

Provided are an electronic device and operation method thereof. The electronic device may include: a display having a biometric sensing region; a biometric sensor disposed in the biometric sensing region; and a processor. The processor may be configured to: operate a first sub-region of the biometric sensing region according to a first display attribute and operate a second sub-region of the biometric sensing region according to a second display attribute; while the first sub-region is operated according to the first display attribute and the second sub-region is operated according to the second display attribute, obtain, through the biometric sensor, a signal corresponding to an external object, wherein the signal is generated at least partially based on light that is emitted from the first sub-region or the second sub-region and reflected by the external object; perform authentication on the external object if the signal satisfies a specified condition; and prevent authentication on the external object if the signal does not satisfy the specified condition.

20 Claims, 27 Drawing Sheets

(58) Field of Classification Search
USPC ........ 382/124, 254; 705/14.23, 14.25, 14.53,
705/14.64, 14.66; 340/5.52, 5.82, 500,
340/540, 541, 573.1; 345/158
See application file for complete search history.

(56) References Cited

U.S. PATENT DOCUMENTS

| | | |
|---|---|---|
| 9,342,729 B2 | 5/2016 | Kim et al. |
| 9,400,893 B2 * | 7/2016 | Tseng ...................... H04W 4/21 |
| 9,711,493 B2 * | 7/2017 | Lin ........................ H01L 25/167 |
| 10,509,466 B1 * | 12/2019 | Miller ....................... G06K 9/52 |
| 2002/0076089 A1 | 6/2002 | Muramatsu et al. |
| 2003/0018522 A1 * | 1/2003 | Denimarck ........ G06Q 30/0255 |
| | | 705/14.23 |
| 2009/0155456 A1 | 6/2009 | Benkley et al. |
| 2012/0219194 A1 | 8/2012 | Monden |
| 2014/0153791 A1 | 6/2014 | Kim et al. |
| 2014/0286548 A1 | 9/2014 | Shin et al. |
| 2016/0092018 A1 | 3/2016 | Lee et al. |
| 2016/0140405 A1 | 5/2016 | Graumann et al. |
| 2017/0068447 A1 | 3/2017 | Hong et al. |
| 2018/0046281 A1 | 2/2018 | Pi et al. |

FOREIGN PATENT DOCUMENTS

| | | |
|---|---|---|
| KR | 10-2016-0117862 A | 10/2016 |
| WO | 2016/205832 A1 | 12/2016 |

\* cited by examiner

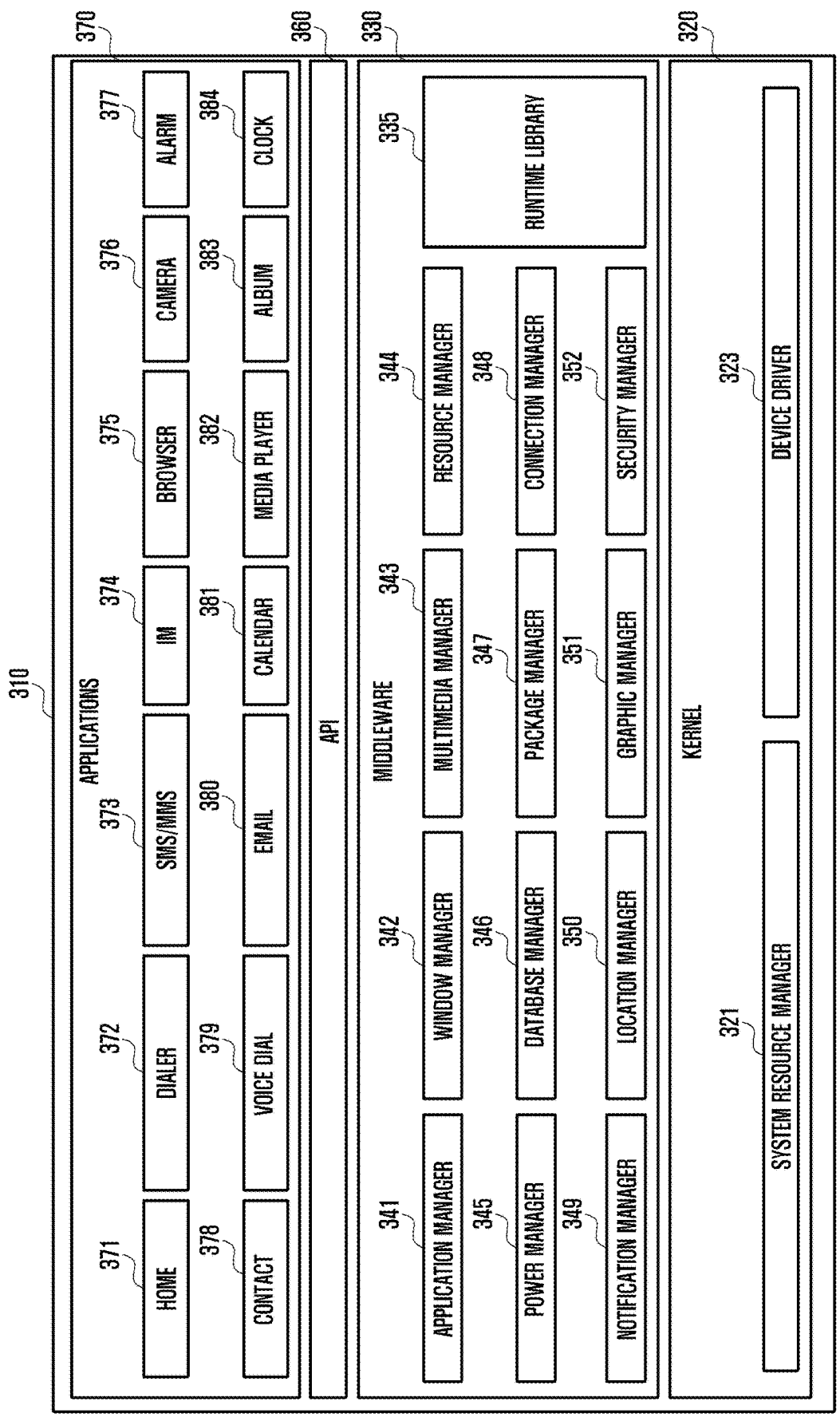

ELECTRONIC DEVICE AND METHOD FOR IDENTIFYING FALSIFICATION OF BIOMETRIC INFORMATION

CROSS-REFERENCE TO RELATED APPLICATION(S)

This application is a Continuation of U.S. patent application Ser. No. 15/924,813 filed on Mar. 19, 2018 which claims the benefit under 35 U.S.C. § 119(a) of a Korean patent application filed on Mar. 20, 2017, in the Korean Intellectual Property Office and assigned Serial No. 10-2017-0034966, the entire disclosure of which is hereby incorporated by reference.

TECHNICAL FIELD

Various embodiments of the present disclosure generally relate to an electronic device and method for identifying forged biometric information, and relate to a display control method for the electronic device and a biometric sensor.

BACKGROUND

Thanks to advances in information and communication technology and semiconductor technology, mobile electronic devices such as smartphones have become a necessity of life. These device can provide various services when users installs various applications in their smartphones.

In recent years, for purposes of authentication and the like, electronic devices have been able to recognize biometric information of users. For example, such an electronic device may include a biometric sensor to recognize user's biometric information. The biometric sensor may be, for example, a fingerprint sensor, a heart rate monitor (HRM) sensor, or an iris sensor.

User authentication through the biometric sensor (e.g. the fingerprint recognition module) is more secure compared with authentication using passwords or pattern inputs. In addition, the process of providing biometric information is simpler for the user than the process of inputting a password.

However, user authentication through biometric sensors may be very vulnerable to forged biometric information. As user authentication through biometric means (e.g. fingerprint sensors) has become increasingly popular in recent years, security attacks using counterfeit biometric information (e.g. forged fingerprints) have become an important security concern. For example, optical fingerprint sensors are known to be vulnerable to security attacks because they cannot readily identify fake fingerprints printed on paper.

SUMMARY

Aspects of the present disclosure are to address at least the above mentioned problems and/or disadvantages and to provide at least the advantages described below. Accordingly, an aspect of the present disclosure is to provide an electronic device and operation method thereof that can enhance the security of the electronic device by accurately identifying falsified biometric information (e.g. counterfeit fingerprint). This may be done by controlling the light source of the biometric sensor.

In accordance with an aspect of the present disclosure, there is provided an electronic device. The electronic device may include: a display having a biometric sensing region; a biometric sensor disposed in the biometric sensing region; and a processor, wherein the processor is configured to: operate a first sub-region of the biometric sensing region according to a first display attribute and operate a second sub-region of the biometric sensing region according to a second display attribute; while the first sub-region is operated according to the first display attribute and the second sub-region is operated according to the second display attribute, obtain, through the biometric sensor, a signal corresponding to an external object, wherein the signal is generated at least partially based on light that is emitted from the first sub-region or the second sub-region and reflected by the external object; perform authentication on the external object if the signal satisfies a specified condition; and prevent authentication on the external object if the signal does not satisfy the specified condition.

In accordance with another aspect of the present disclosure, there is provided a method of operation for an electronic device including a biometric sensor and a display having a biometric sensing region. The method may include: operating a first sub-region of the biometric sensing region according to a first display attribute and operating a second sub-region of the biometric sensing region according to a second display attribute; while the first sub-region is operated according to the first display attribute and the second sub-region is operated according to the second display attribute, obtaining, through the biometric sensor, a signal corresponding to an external object, wherein the signal is generated at least partially based on light that is emitted from the first sub-region or the second sub-region and reflected by the external object; performing authentication on the external object if the signal satisfies a specified condition; and preventing authentication on the external object if the signal does not satisfy the specified condition.

As a feature of the present disclosure, security is enhanced because disclosed embodiments may accurately identify falsified biometric information (e.g. counterfeit fingerprint) by controlling the light source of the biometric sensor.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 3 is a block diagram of program modules according to an embodiment of the present disclosure.

DETAILED DESCRIPTION

Figure 1:
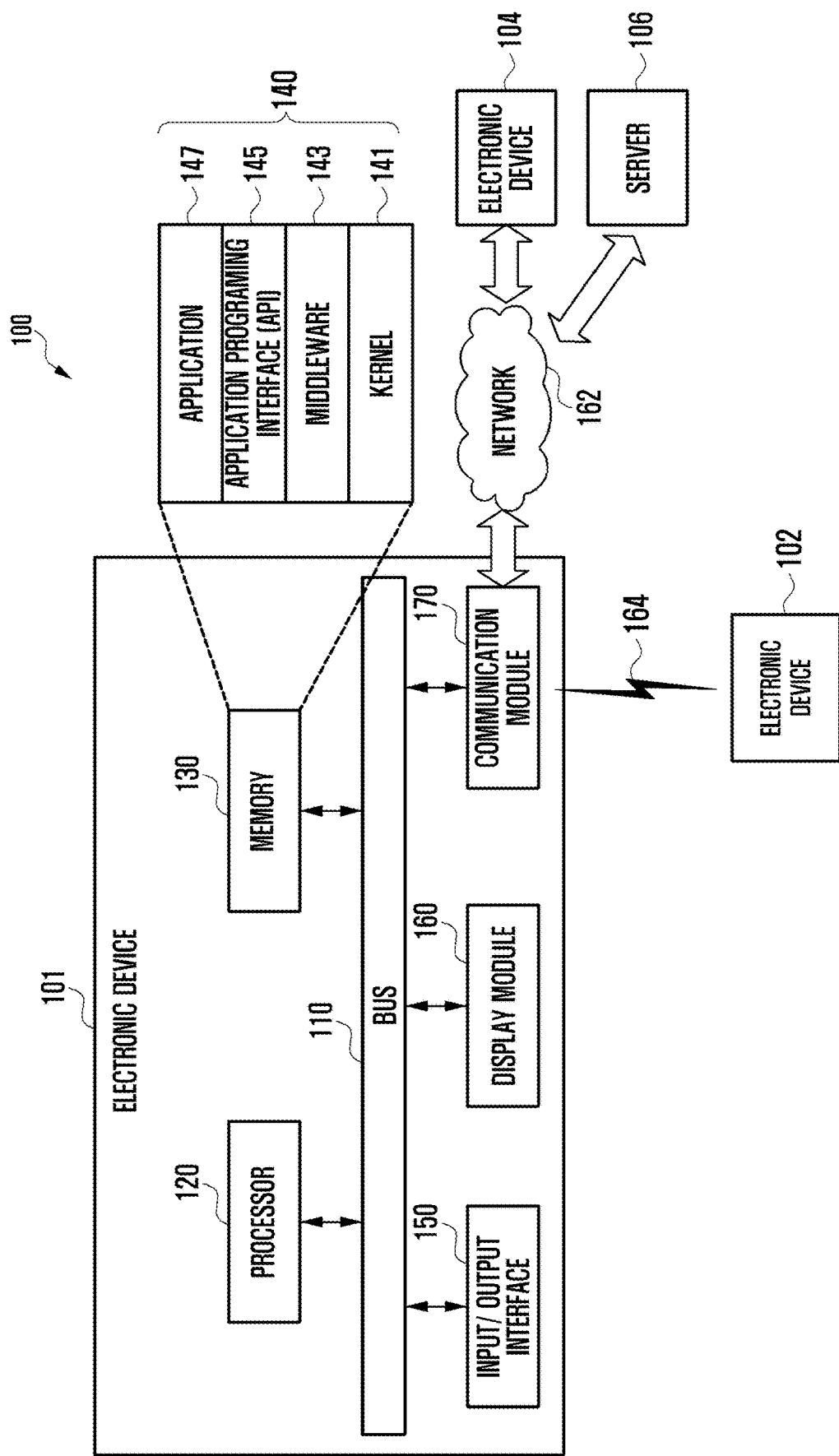
FIG. 1 illustrates a network environment including electronic devices according to an embodiment of the present disclosure.

The following description with reference to the accompanying drawings is provided to assist in a comprehensive understanding of various embodiments of the present disclosure as claimed by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and structures may be omitted for clarity and conciseness.

The terms and words used in the following description and claims are not limited to the dictionary meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" may also refer to the plural, unless otherwise specified. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, operation, constituent element, component or a combination thereof, but may not be construed to exclude the existence of or a possibility of addition of one or more other characteristics, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may refer to various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. A first element could be termed a second element, and similarly, a second element could be also termed a first element without departing from the scope of the present disclosure.

In the case where a component is referred to as being "connected to" or "accessed be" another component, it should be understood that the component may not be directly connected to or accessed by the other component, but also there may exist another component between them. Meanwhile, in the case where a component is referred to as being "directly connected to" or "directly accessed by" another component, it should be understood that there is no third component therebetween. The terms used in the present disclosure are only used to describe specific various embodiments, and are not intended to limit the present disclosure.

Electronic devices according to various embodiments of the present disclosure may be smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart watches, and the like.

According to another embodiment, the electronic devices may be home appliances, such as televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™, electronic dictionaries, electronic keys, camcorders, electronic picture frames, or the like.

According to another embodiment, the electronic devices may be medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, medical scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales devices (POSs), or IoT (Internet of Things) devices (e.g., light bulbs, sensors, electric or gas meters, sprinkler devices, fire alarms, thermostats, street lamps, toasters, exercise equipment, hot water tanks, heaters, boilers, and the like). It may be readily apparent to those skilled in the art that the electronic device according to the present disclosure is not limited to the aforementioned devices.

FIG. 1 illustrates a network environment including electronic devices according to an embodiment of the present disclosure.

Referring to FIG. 1, the electronic device 101 may include a bus 110, a processor 120, a memory 130, an input/output interface 150, a display 160 and a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, input/output interface 150, the display 160, the communication interface 170, etc.) through the bus 110, may interpret the received commands, and may execute calculation or data processing according to the interpreted commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may store commands or data received from the processor 120 or other elements (e.g., the input/output interface 150, a display 160 and a communication interface 170, etc.) or generated by the processor 120 or the other elements. The memory 130 may include programming modules, such as a kernel 131, middleware 132, an Application Programming Interface (API) 133, an application 134, and the like. Each of the above-described programming modules may be implemented in software, firmware, hardware, or a combination of two or more thereof.

The kernel 131 may control or manage system resources (e.g., the bus 110, the processor 120, the memory 130, and/or other hardware and software resources) used to execute operations or functions implemented by other programming modules (e.g., the middleware 132, the API 133, and the application 134). Also, the kernel 131 may provide an interface capable of accessing and controlling or managing the individual elements of the electronic device 101 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. Also, in relation to work requests received from one or more applications 134 and/or the middleware 132, for example, may perform load balancing of the work requests by using a method of assigning a priority, in which system resources (e.g., the bus 110, the processor 120, the memory 130, etc.) of the electronic device 101 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display module 160 may display a video, an image, data, or the like to the user.

The communication interface module 170 may connect communication between another electronic device 102 and the electronic device 101. The communication interface module 170 may support a predetermined short-range communication protocol (e.g., Wi-Fi, BlueTooth (BT), and Near Field Communication (NFC)), or predetermined network 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 101. Further, the communication interface module 170 may connect communication between a server 164 and the electronic device 101 via the network 162.

Figure 2:
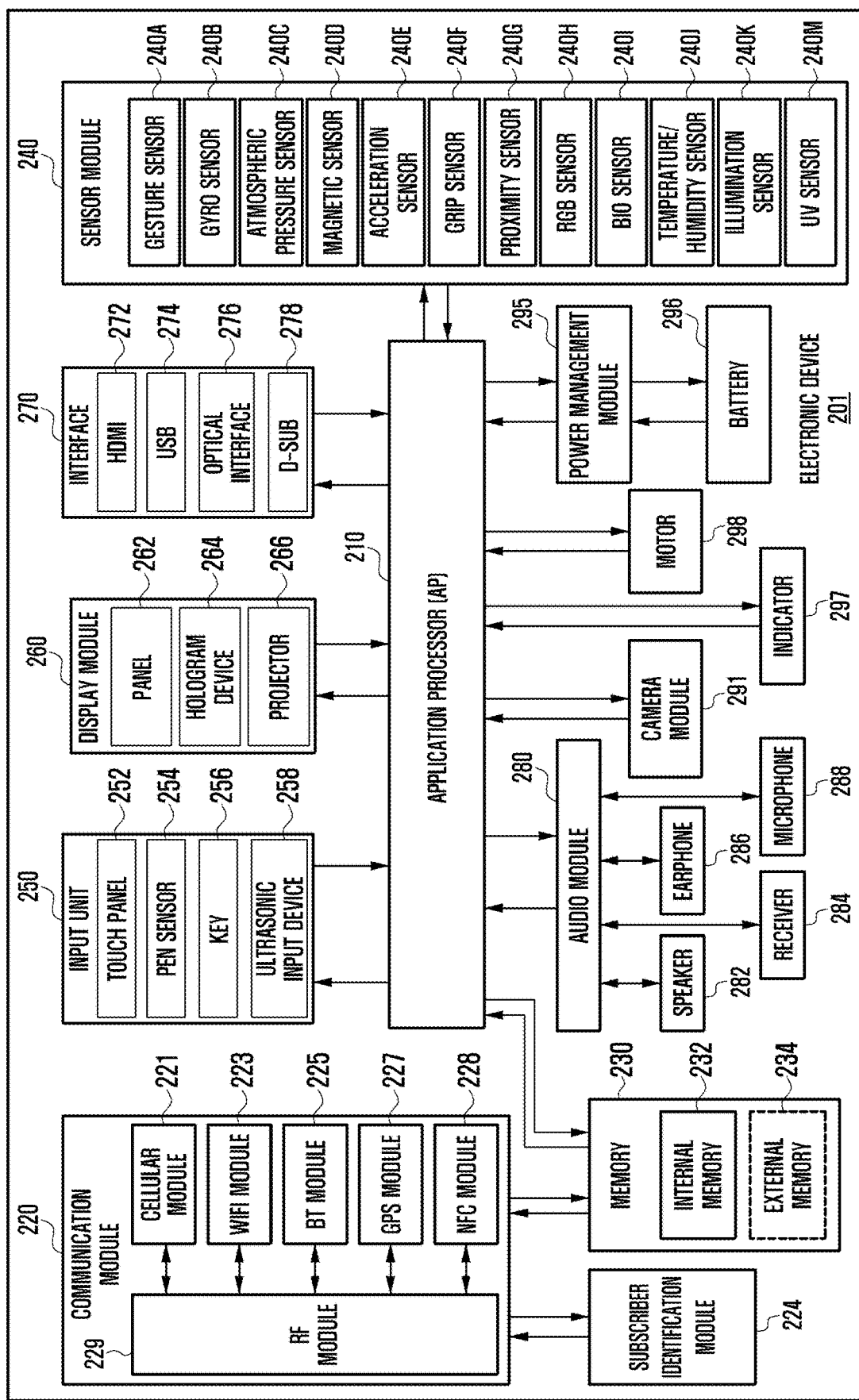
FIG. 2 is a block diagram of an electronic device according to an embodiment of the present disclosure.

FIG. 2 is a block diagram illustrating an electronic device 201 according to an embodiment of the present disclosure.

The hardware shown in FIG. 2 may be, for example, the electronic device 101 illustrated in FIG. 1.

Referring to FIG. 2, the electronic device may include one or more processors 210, a communication module 220, a Subscriber Identification Module (SIM) card 224, a memory 230, a sensor module 240, a input device 250, a display module 260, an interface 270, an audio module 280, a camera module 291, a power management module 295, a battery 296, an indicator 297, a motor 298 and any other similar and/or suitable components.

The Application Processor (AP) 210 (e.g., the processor 120) may include one or more Application Processors (APs), or one or more Communication Processors (CPs). The processor 210 may be, for example, the processor 120 illustrated in FIG. 1. The AP 210 is illustrated as being included in the processor 210 in FIG. 2, but may be included in different Integrated Circuit (IC) packages, respectively. According to an embodiment of the present disclosure, the AP 210 may be included in one IC package.

The AP 210 may execute an Operating System (OS) or an application program, and thereby may control multiple hardware or software elements connected to the AP 210 and may perform processing of and arithmetic operations on various data including multimedia data. The AP 210 may be implemented by, for example, a System on Chip (SoC). According to an embodiment of the present disclosure, the AP 210 may further include a Graphical Processing Unit (GPU) (not illustrated).

The AP 210 may manage a data line and may convert a communication protocol in the case of communication between the electronic device (e.g., the electronic device 101) including the hardware and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., Integrated Circuit Card IDentifier (ICCID)) or subscriber information (e.g., International Mobile Subscriber Identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include a cellular module 221, a wireless (WiFi) communication module 223 or a Radio Frequency (RF) module 229. The communication module 220 may be, for example, the communication interface 170 illustrated in FIG. 1. The communication module 220 may include, for example, a Wi-Fi part 223, a BT part 225, a GPS part 227, or a NFC part 228. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the hardware to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware may receive a user input from an external device (e.g., a network, a computer, or a server), which is connected to the communication module 220, through the communication module 220.

The display module 260 may include a panel 262, a hologram 264, or projector 266. The display module 260 may be, for example, the display module 160 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio module 280 may bidirectionally convert between a voice and an electrical signal. The audio module 280 may convert voice information, which is input to or output from the audio module 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware or a part (e.g., the AP 211) of the hardware, for example, a booting state, a message state, a charging state and the like. The motor 298 may convert an electrical signal into a mechanical vibration. The processor 210 may control the sensor module 240.

Although not illustrated, the hardware may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware according to an embodiment of the present disclosure may include one or more components, and the name of the relevant element may change depending on the type of electronic device. The hardware according to an embodiment of the present disclosure may include at least one of the above-described elements. Some of the above-described elements may be omitted from the hardware, or the hardware may further include additional elements. Also, some of the elements of the hardware according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future.

FIG. 3 is a block diagram illustrating one or more programming modules 300 according to an embodiment of the present disclosure.

The programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the hardware), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

According to various embodiments of the present disclosure, the electronic device may include: a display having a biometric sensing region; a biometric sensor disposed in the biometric sensing region; and at least one processor, wherein the processor is configured to: operate a first sub-region of the biometric sensing region according to a first display attribute and operate a second sub-region of the biometric sensing region according to a second display attribute; while the first sub-region is operated according to the first display attribute and the second sub-region is operated according to the second display attribute, obtain, through the biometric sensor, a signal corresponding to an external object, wherein the signal is generated at least partially based on light that is emitted from the first sub-region or the second sub-region and reflected by the external object; perform authentication on the external object if the signal satisfies a specified condition; and prevent authentication on the external object if the signal does not satisfy the specified condition. Operating the first sub-region of the biometric sensing region according to the first display attribute and operating the second sub-region of the biometric sensing region according to the second display attribute may be performed when the external object is in contact with or in proximity to the biometric sensing region. In operating the first sub-region of the biometric sensing region according to the first display attribute and operating the second sub-region of the biometric sensing region according to the second display attribute, the processor may be further configured to adjust brightness, color, or grayscale of the display or a voltage applied to the display. In operating the first sub-region of the biometric sensing region according to the first display attribute and operating the second sub-region of the biometric sensing region according to the second display attribute, the processor may be further configured to activate at least one pixel included in the first sub-region and deactivate at least one pixel included in the second sub-region. The biometric sensor may be configured to include a first biometric sensing region corresponding to the first sub-region and a second biometric sensing region corresponding to the second sub-region, and the processor may be further configured to determine whether the signal satisfies the specified condition at least partially based on a first signal generated by the first biometric sensing region or a second signal generated by the second biometric sensing region. The processor may be further configured to: determine that the specified condition is satisfied if a portion of the signal corresponds to a designated frequency, and determine that the specified condition is not satisfied if the portion of the signal does not correspond to the designated frequency. The processor may be further configured to: select a first portion of the signal corresponding to a first pixel included in the second sub-region of the display and select a second portion of the signal corresponding to a second pixel included in the second sub-region; assign a first weight to the first portion and assign a second weight to the second portion; and determine whether the specified condition is satisfied at least partially based on the first portion weighted with the first weight and the second portion weighted with the second weight. The processor may be further configured to: operate the first sub-region and the second sub-region according to a same display attribute; while the first sub-region and the second sub-region are operated according to the same display attribute, obtain, through the biometric sensor, a second signal corresponding to the external object, wherein the second signal is generated at least partially based on light from the first sub-region or the second sub-region and reflected by the external object; and perform the authentication at least partially based on the second signal. The processor may be further configured to periodically change the first display attribute or the second display attribute. Operating the first sub-region of the biometric sensing region according to the first display attribute and operating the second sub-region of the biometric sensing region according to the second display attribute may be performed when the electronic device is in a specified state or an application running on the electronic device required a specified security. The processor may be further configured to: set at least a portion of a border of the biometric sensing region as the second sub-region; and set at least a portion of a remaining region of the biometric sensing region as the first sub-region.

Figure 4A:
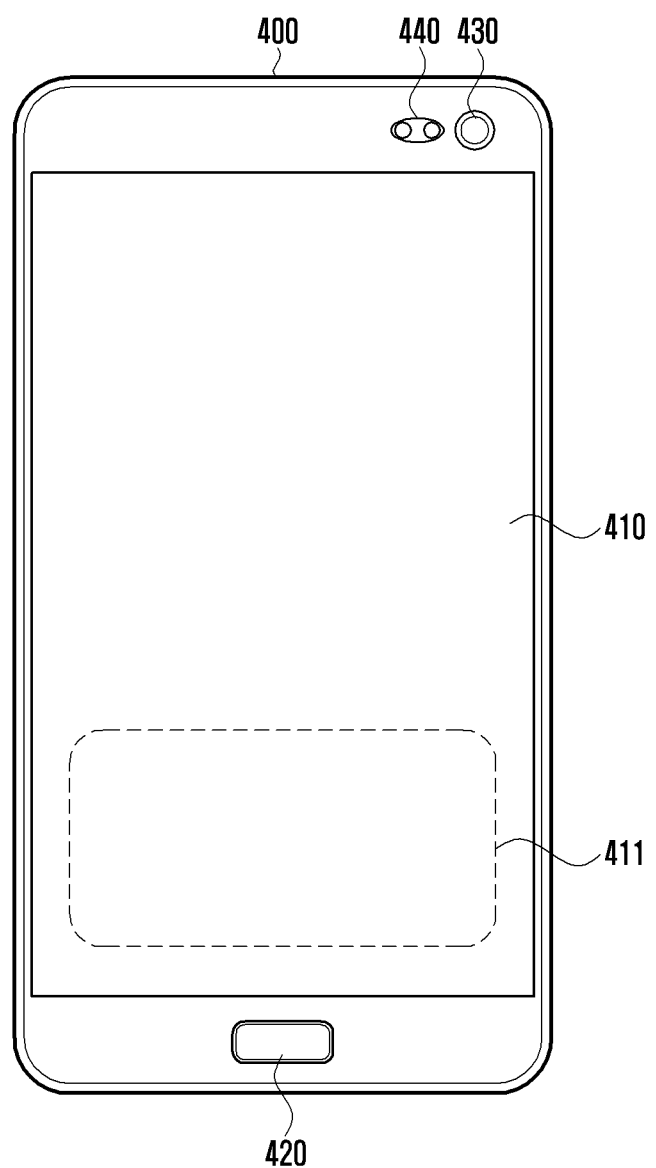
FIG. 4A and FIG. 4B are front views of an electronic device according to an embodiment of the present disclosure.
Figure 4B:
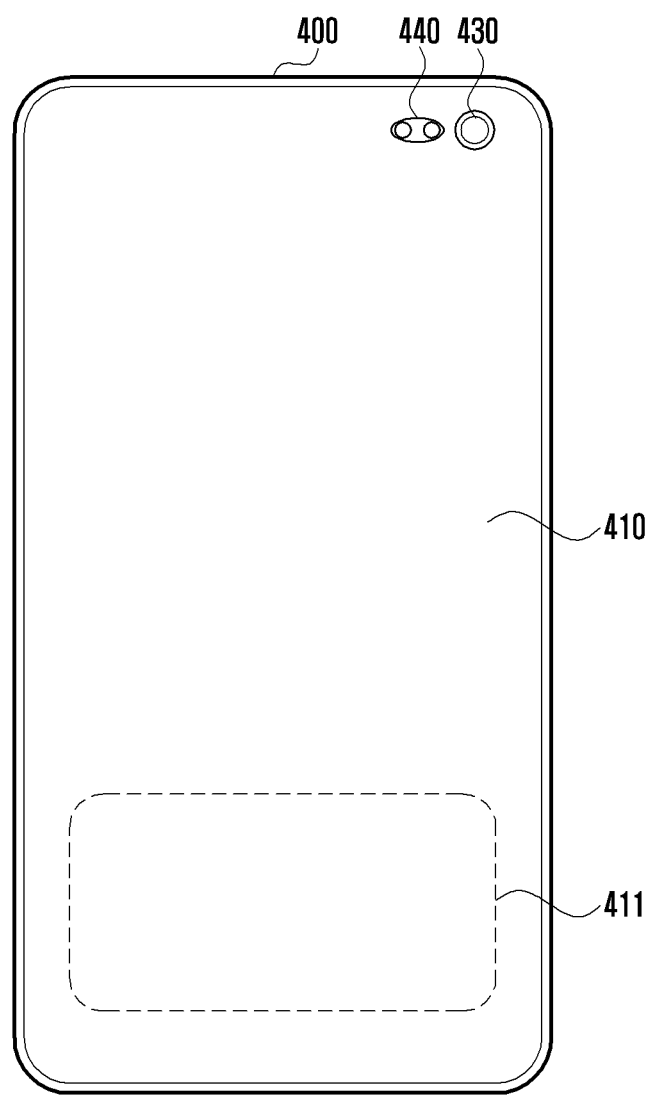

FIGS. 4A and 4B are front views of an electronic device according to an embodiment of the present disclosure.

With reference to FIG. 4A, in one embodiment, the electronic device 400 (e.g. electronic device 101) includes a front display 410 (e.g. display 160), and the biometric sensor 411 (e.g. biometric sensor 240I) may be positioned to overlap at least a portion of the screen area of the display 410. In one embodiment, an operation button (e.g. home button) 420 may be disposed at one portion (e.g. lower end portion) of the screen area of the display 410, and a camera 430 and at least one sensor 440 may be disposed at the other portion (e.g. upper end portion) of the screen area of the display 410. In one embodiment, the biometric sensor 411 may be disposed in the active area or black matrix area of the display 410.

The fact that the biometric sensor 411 is positioned so as to overlap at least a portion of the screen area of the display 410 may mean that the biometric sensor 411 is disposed inside the portion of the screen area of the display 410, that the biometric sensor 411 is disposed above the display 410 so as to overlap the portion of the screen area of the display 410, or that the biometric sensor 411 is disposed under the display 410 so as to overlap the portion of the screen area of the display 410. When the biometric sensor 411 is disposed above or under the display 410, the biometric sensor 411 may be directly attached to the corresponding surface (upper surface or lower surface) of the display 410 via an adhesive layer (not shown). Thus, when the biometric sensor 411 is disposed above or under the display 410, at least one other component may be disposed between the biometric sensor 411 and the display 410. In one embodiment, the biometric sensor 411 may be disposed under the display 410. For example, the biometric sensor 411 may acquire biometric information of an object (e.g. user's finger) when that object is placed on the area of the display 410 corresponding to the biometric sensor 411.

With reference to FIG. 4B, in another embodiment, the electronic device 400 may include a display 410 whose screen area is expanded to encompass the whole front face of the electronic device 400, and the biometric sensor 411 may be positioned to overlap a portion of the screen area of the display 410. In one embodiment, the biometric sensor 411 may be disposed under the screen area. The positioning of the biometric sensor 411 will be described in more detail later with reference to FIG. 5. For example, the physical key (e.g. operation button 420) may be removed from the front face of the electronic device 400, and the larger screen area of the display 410 may encompass the region that housed the physical key in FIG. 4A (e.g. the lower region of the front face in which the home button is positioned). Similarly, the camera 430 and the at least one sensor 440 may be disposed to overlap a portion of the screen area of the display 410, such that the larger screen area of the display 410 also occupies the region that housed the camera 430 and the at least one sensor 440 in FIG. 4A. In one embodiment, in place of the physical key 420, an operation button using a touch sensor or a pressure sensor may be disposed to overlap a region of the screen area corresponding to the original location of the physical key 420. Accordingly, the screen area of the display 410 shown in FIG. 4B may be larger than the area occupied by the screen area of the display 410 shown in FIG. 4A.

Figure 5:
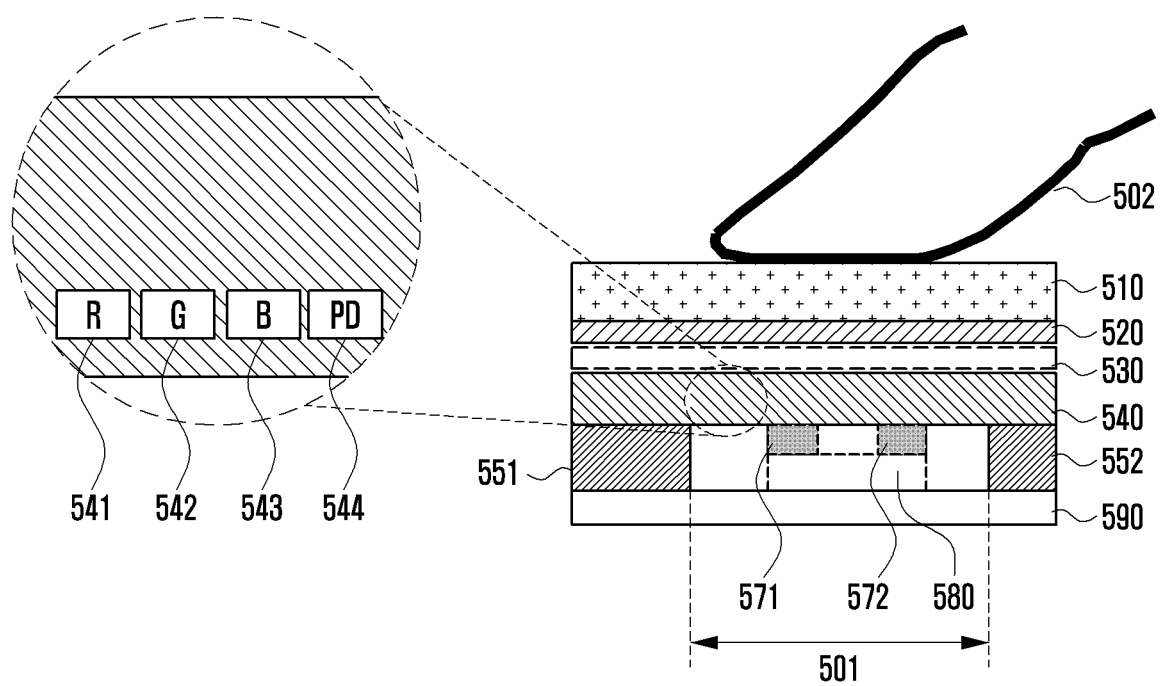
FIG. 5 is a cross-sectional view of an electronic device including a biometric sensor mounted on a screen area of the display, according to an embodiment of the present disclosure.

FIG. 5 is a cross-sectional view of an electronic device including a biometric sensor mounted on the screen area of the display, according to an embodiment of the present disclosure.

With reference to FIG. 5, in one embodiment, the cross-sectional structure of the electronic device (e.g. electronic device 400) may include a glass 510, an adhesive layer 520, a touch sensor 530 (e.g. touch panel 252), which, as described below, may be used as a biometric sensor, a display 540 (e.g. display 160), and a PCB 590.

In one embodiment, to sense user's biometric information, the electronic device 400 may include a biometric sensor 530, 544 or 580 (e.g. biometric sensor 411) mounted at a position corresponding to a region 501 of the display 540. The region 501 of the display 540 may be the same or similar region as the region in which the biometric sensor 411 is formed in the screen area of the display 410 in FIG. 4A or 4B. The biometric sensor 530, 544 or 580 may be positioned to overlap one or more partial regions of the display 540 (e.g. one region or plural regions), or may be positioned to overlap the whole screen area (e.g. active area) of the display 540.

The biometric sensor 530 may be located above the display 540, the biometric sensor 544 may be embedded in a region of the display 540, and the biometric sensor 580 may be located under the display 540. The biometric sensor 530, 544 or 580 may be variously implemented using optical image sensors, ultrasonic transmission/reception modules, electrostatic transmission/reception electrode patterns, etc.

In one embodiment, the biometric sensor 530 may be positioned between the adhesive layer 520 and the display 540. Although not shown, the biometric sensor 530 may also be positioned between the glass 510 and the adhesive layer 520. The biometric sensor 530 may be implemented using an electrostatic transmission/reception electrode pattern, and may be formed as a transparent electrode to increase the transmittance of light outputted from the display 540. The biometric sensor 530 may also be implemented using an ultrasonic transmission/reception module.

In another embodiment, the biometric sensor 544 may be formed in the active area or black matrix area of the display 540. For example, the display 540 may include at least one of the red pixel 541, the green pixel 542, and the blue pixel 543, and the biometric sensor 544 may be implemented as a photodiode (PD) or phototransistor located at the same layer as the pixels. In one embodiment, the biometric sensor 544 may be an optical fingerprint sensor that uses light output from the display 540 as tis light source. For example, the biometric sensor 544 may obtain user's fingerprint information 502 by sensing the light that is outputted from the display 540 and then is reflected by the user's finger. In a different embodiment, the optical biometric sensor 544 may obtain user's fingerprint information 502 by using light outputted from its own independent light source, i.e. in this embodiment, the optical biometric sensor 544 does not use the light outputted from the display 540. For example, the optical biometric sensor 544 may include an infrared light emitting diode (LED), not shown in FIG. 5. The infrared LED may be located, for example, below the display 540 or located at a portion of the border area of the display 540.

In one embodiment, the biometric sensor 580 may be located below the display 540. For example, the biometric sensor 580 and sealing structures 551 and 552 for securing a mounting space of the biometric sensor 580 may be disposed under the display 540. In one embodiment, the biometric sensor 580 may be an optical fingerprint sensor that uses light output from the display 540 as its light source. In a different embodiment, the biometric sensor 580 may obtain user's fingerprint information 502 using its own independent light source. The sealing structures 551 and 552 may be configured to protect the biometric sensor 580 from, for example, external impact. In one embodiment, the biometric sensor 580 may be located within an internal space formed by the sealing structures 551 and 552 (e.g. the space between the sealing structures 511 and 552). For example, the biometric sensor 580 may be formed on the base substrate 590 and be positioned between the display 540 and the substrate 590. Between the biometric sensor 580 and the display 540, elastic bodies 571 and 572 (e.g. plastic, sponge or rubber) may be formed for shock absorption or for the prevention of foreign matter inflow.

Figure 6:
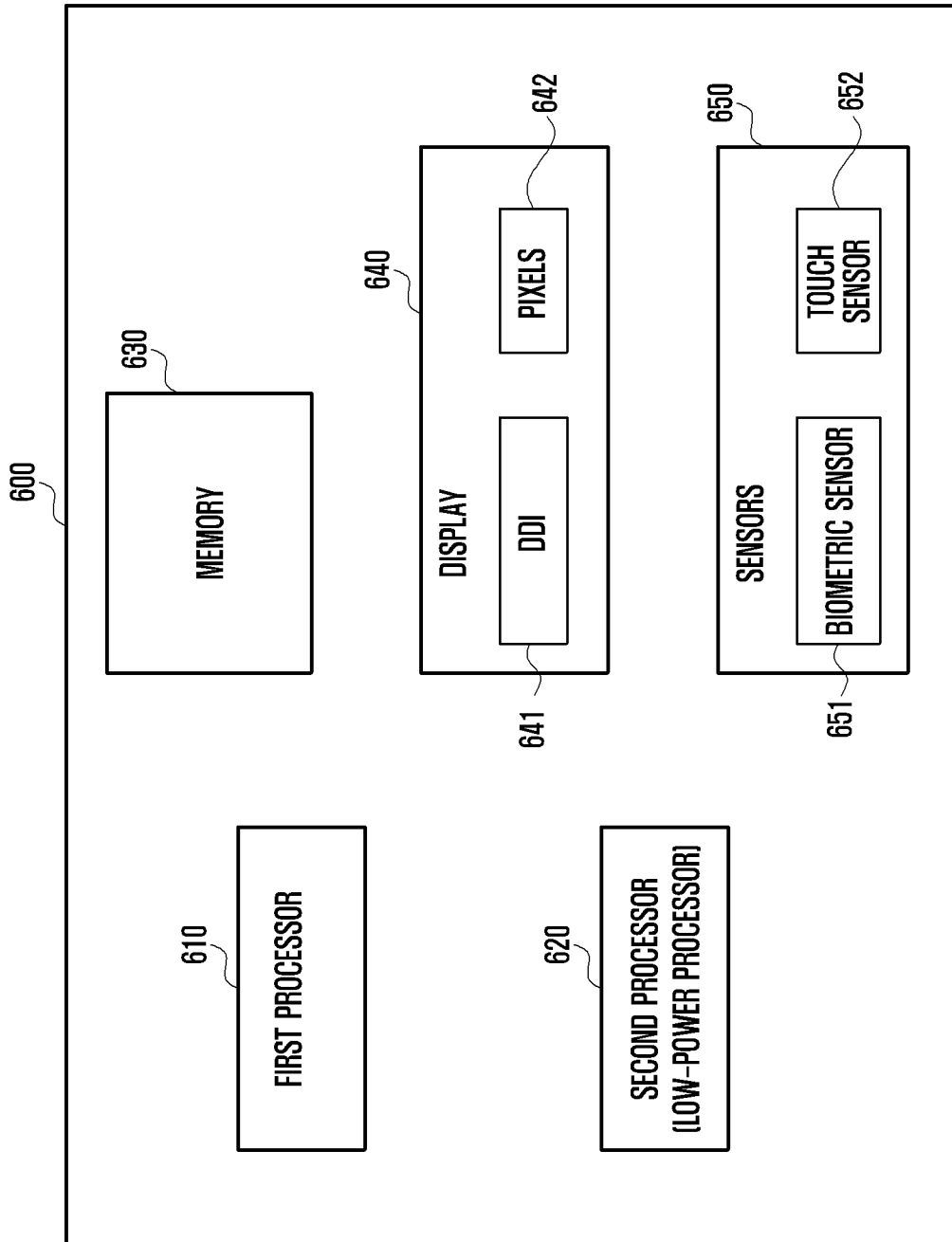
FIG. 6 is a block diagram illustrating an electronic device according to an embodiment of the present disclosure.

FIG. 6 is a block diagram illustrating an electronic device according to an embodiment of the present disclosure.

With reference to FIG. 6, in one embodiment, the electronic device 600 (e.g. electronic device 101) may include at least one processor (e.g. first processor 610 or second processor 620), a memory 630 (e.g. memory 130), a display 640 (e.g. display 540), and at least one sensor 650. The at least one processor 610 or 620 may be the same as or similar to, for example, the processor 120.

The first processor 610 (e.g. main processor) may control the overall operation of the electronic device 600.

For example, when the electronic device 600 is in its sleep state, the second processor 620 (e.g. low-power processor, or sensor HUB) may process sensing information obtained via the at least one sensor 650 or inputs from the user. The second processor 620 may perform this processing without waking up the first processor 610. That is, the second processor 620 may control the at least one sensor 650 or the display 640 independently of the first processor 610.

The memory 630 may include a normal section for storing user applications or the like, and a secured section for storing security sensitive information such as fingerprint information.

The display 640 may include a display panel 642 including a plurality of pixels, and a display driver module 641 (e.g. display driver IC, DDI) configured to control at least some of the pixels included in the display panel 642 so as to display information.

The at least one sensor 650 may include, for example, a biometric sensor 651 (e.g. biometric sensor 240I) for sensing the fingerprint of a user on the display 640, and a touch sensor 652 (e.g. touch panel 252) for detecting a user touch on the display 640 or a proximity input near the display 640. The at least one sensor 650 may be identical or similar to the sensor module 240 and include an optical fingerprint sensor. In one embodiment, the biometric sensor 651 may be an optical fingerprint sensor (e.g. image sensor) that uses light output from the display 640 as a light source. Alternatively, the biometric sensor 651 may be an ultrasonic fingerprint sensor. In another embodiment, the biometric sensor 651 may be a capacitive fingerprint sensor.

In various embodiments, the at least one sensor 650 may drive a plurality of pixels included in the display panel 642 via the display driver module 641 in response to a user input. In one embodiment, the least one sensor 650 may control the display panel 642 to obtain a user input or biometric information of the user. For example, to acquire biometric information of the user, the biometric sensor 651 may control the display panel 642 and use the light emitted therefrom.

Figure 7:
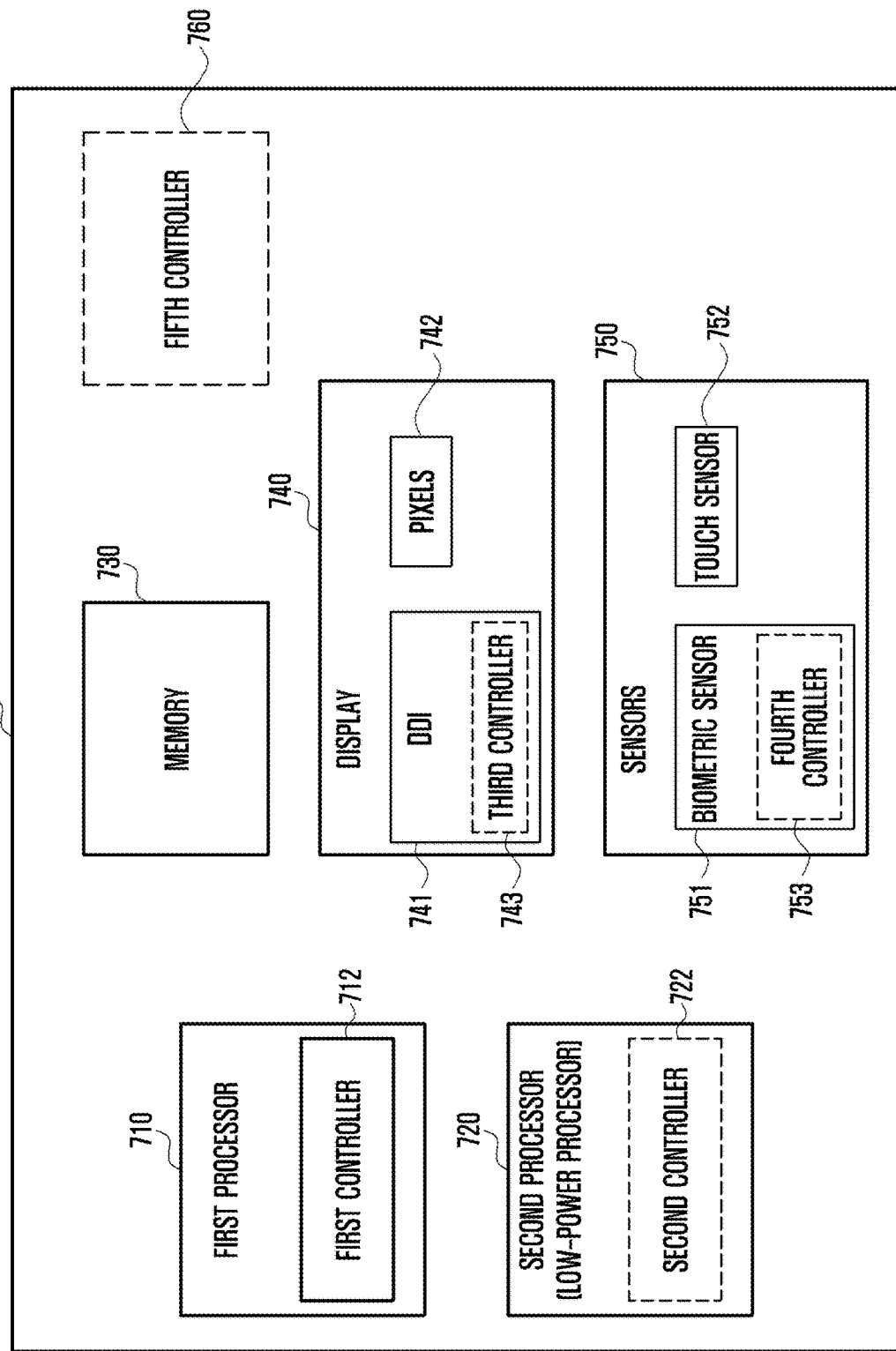
FIG. 7 is a block diagram illustrating an electronic device according to another embodiment of the present disclosure.

FIG. 7 is a block diagram illustrating an electronic device according to another embodiment of the present disclosure.

With reference to FIG. 7, the electronic device 700 (e.g. electronic device 101) may include at least one processor (e.g. first processor 710 or second processor 720), a memory 730 (e.g. memory 130), a display 740 (e.g. display 540), and at least one sensor 750. The at least one processor 710 or 720 may be identical or similar to, for example, the processor 120. The at least one sensor 750 may include, for example, a biometric sensor 751 (e.g. biometric sensor 240I) for sensing the fingerprint of a user on the display 740, and a touch sensor 752 (e.g. touch panel 252) for detecting a user touch on the display 740 or a proximity input near the display 740.

In one embodiment, the electronic device 700 (e.g. electronic device 101) may include a plurality of controllers, such as a first controller 712, a second controller 722, a third controller 743, a fourth controller 753, and a fifth controller 760. The controllers may be included respectively in the corresponding modules constituting the electronic device 700, such as the first processor 710, the second processor 720, the DDI 741 (e.g. display driver module 641), and the biometric sensor 751.

In one embodiment, the electronic device 700 may control a specific module by using the controller included in the module. For example, the electronic device 700 may control the first processor 710 using the first controller 712 and control the second processor 720 using the second controller 722. The electronic device 700 may control the DDI 741 using the third controller 743 and control the biometric sensor 751 using the fourth controller 753.

In one embodiment, the electronic device 700 may designate one controller as the main controller and control all the modules thereof by controlling the remaining controllers through the designated main controller, i.e. the electronic device 700 may use the main controller to control the remaining controllers. For example, the fifth controller 760 may be designated as the main controller and the electronic device 700 may use the fifth controller 760 to control the first controller 712, the second controller 722, the third controller 743, and the fourth controller 753. The electronic device 700 may change the designation of the main controller. For example, the electronic device 700 may change the main controller from the fifth controller 760 to the first controller 712 and use the first controller 712 to control the remaining controllers (the second to fifth controllers 722, 743, 753 and 760).

Alternatively, the electronic device 700 may directly control the modules thereof using a single controller. For example, the electronic device 700 may use the first controller 712 included in the first processor 710 to directly control the second processor 720, the memory 730, the display 740, and/or the at least one sensor 750. In another embodiment, the electronic device 700 may use one controller to directly control the display 740 and the at least one sensor 750. For example, when the biometric sensor 751 is an optical fingerprint sensor that uses the display 740 as its light source, the electronic device 700 may use a single controller to control the display 740 and the biometric sensor 751, so that it may easily obtain fingerprint information of the user.

Figure 8:
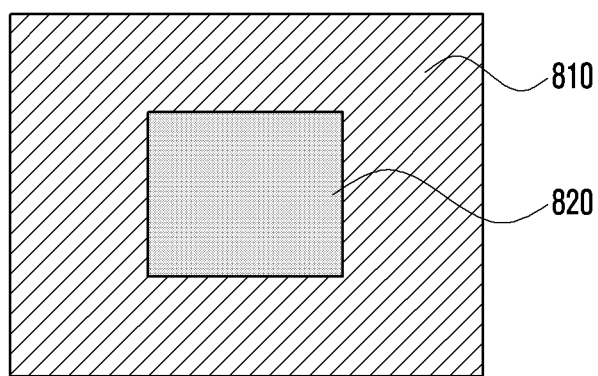
FIG. 8 is a diagram illustrating a portion of the display as a light source for an optical biometric sensor, according to an embodiment of the present disclosure.

FIG. 8 is a diagram illustrating a portion of the display (e.g. region 501 of the display 540 in FIG. 5) as a light source for an optical biometric sensor, according to an embodiment of the present disclosure.

With reference to FIG. 8, the processor (e.g. first processor 610 or second processor 620) may control at least a portion of the display (e.g. display 540) as a light source to output light and drive the optical biometric sensor (e.g. biometric sensor 580) to sense the biometric information generated using the light source. For example, the processor 610 or 620 may set the first sub-region 810 to a first display attribute and set the second sub-region 820 to a second display attribute. That is, the processor 610 or 620 may control the first sub-region 810 of the display 540 to output light corresponding to the first display attribute, and control the second sub-region 820 of the display 540 to output light corresponding to the second display attribute. The first display attribute and the second display attribute may be different in terms of color, brightness, intensity, etc.

In one embodiment, as part of setting the first display attribute and the second display attribute, the processor 610 or 620 may adjust the brightness, color, or grayscale of the display 540 and at least one voltage applied to the display 540. In one embodiment, the processor 610 or 620 may activate the pixels included in the first sub-region 810 of the display 540 according to the first display attribute, and may deactivate the pixels included in the second sub-region 820 of the display 540 according to the second display attribute. Deactivating a pixel may mean, for example, that the brightness of the pixel is set to zero (0) or the pixel does not emit light.

In one embodiment, the processor 610 or 620 may set the first display attribute to a specific color (e.g. cyan) and set the second display attribute to zero brightness. For example, the processor 610 or 620 may control the first sub-region 810 of the display 540 to emit cyan color light according to the first display attribute, and control the pixels included in the second sub-region 820 of the display 540 to be deactivated according to the second display attribute.

As described above, the processor 610 or 620 may control the display 540 to deactivate at least some pixels in the biometric sensing region 501. This operation may be used to identify forged biometric information.

Next, a detailed description of a scheme for identifying falsified biometric information is given. In the scheme, the display 540 serving as a light source of the optical biometric sensor 580 is partially controlled.

Figure 9A:
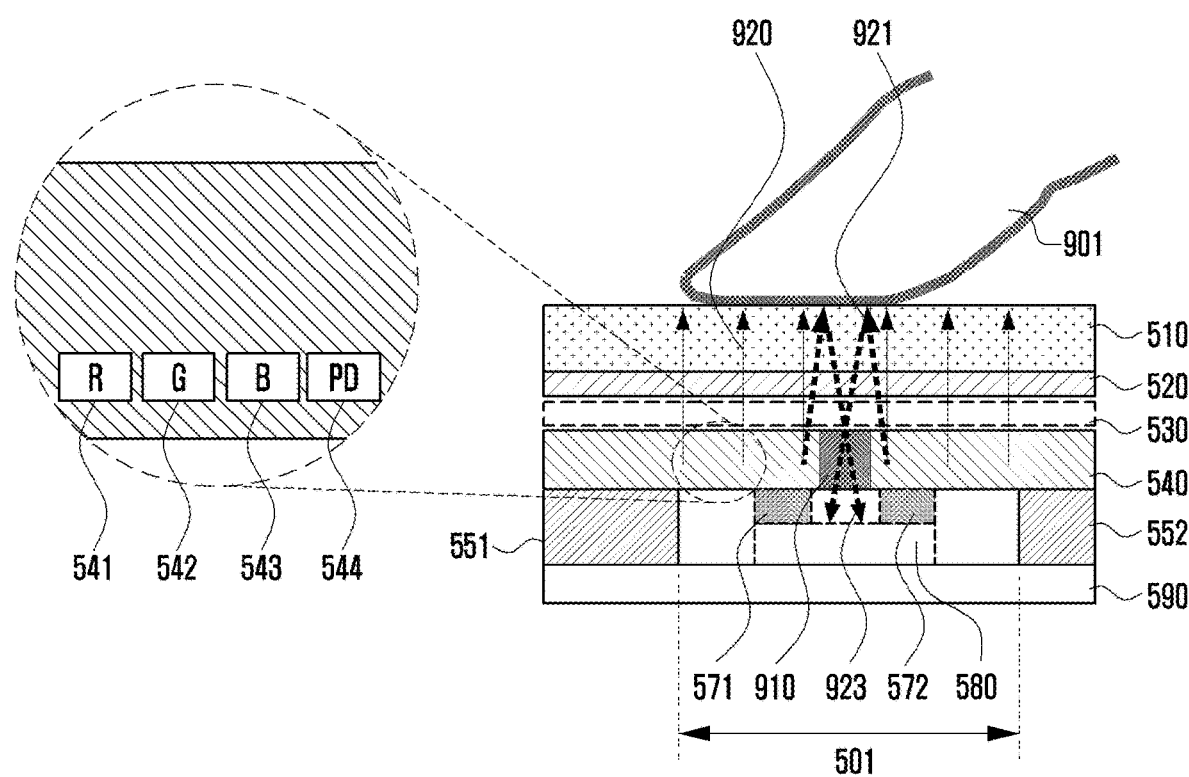
FIG. 9A and FIG. 9B are schematic cross-sectional views of an electronic device illustrating a scheme for identifying falsified biometric information, according to an embodiment of the present disclosure.
Figure 9B:
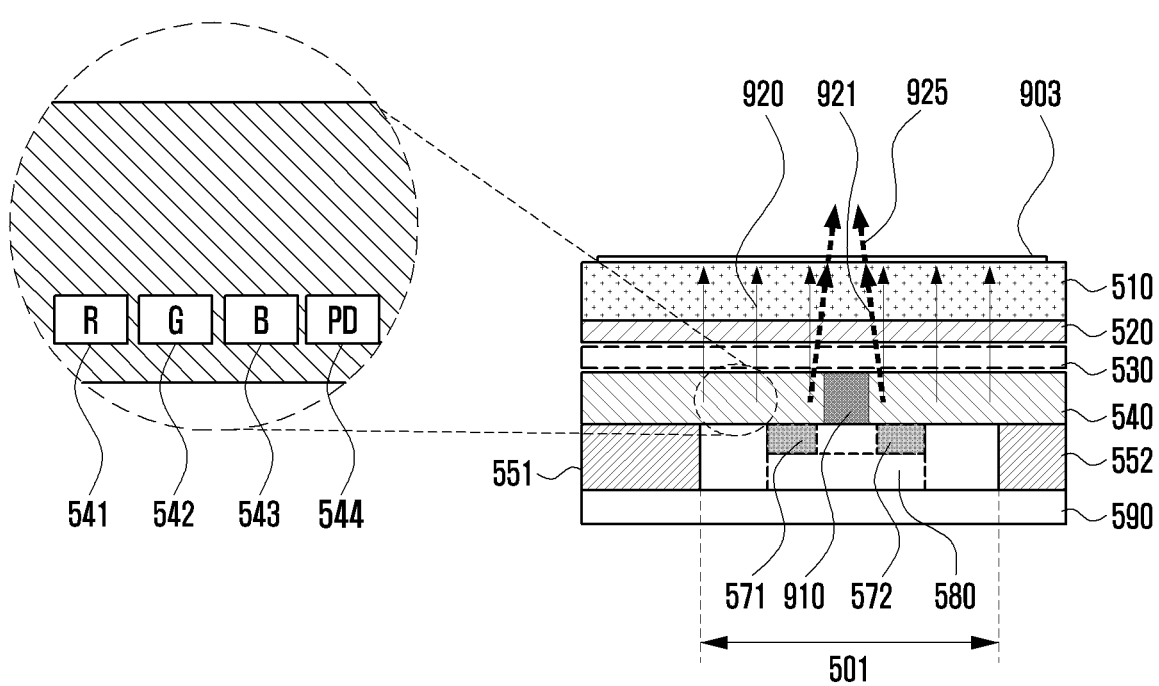

FIGS. 9A and 9B are schematic cross-sectional views of an electronic device illustrating a scheme for identifying falsified biometric information. The electronic device (e.g. electronic device 600) shown in FIGS. 9A and 9B may be identical or similar to the electronic device shown in FIG. 5. In FIGS. 9A and 9B, the same or similar components or features as those in FIG. 5 are denoted by the same reference numerals.

For ease of description, only operations or elements not previously described will be described below. FIG. 9A depicts a case where an actual fingerprint 901 of the user is inputted to the electronic device 600. FIG. 9B depicts a case where a counterfeit fingerprint 903 (e.g. a photocopy of the user's actual fingerprint) is inputted to the electronic device 600.

In FIG. 9A, the processor (e.g. first processor 610 or second processor 620) may change attributes of at least some region of the display 540. For example, among the biometric sensing region 501 of the display 540, the processor 610 or 620 may set the first sub-region 810 to a first display attribute and set the second sub-region 820 a second display attribute which is different than the first display attribute. The processor 610 or 620 may control the first sub-region 810 to emit light corresponding to the first display attribute and control the second sub-region 820 to emit light corresponding to the second display attribute. The first display attribute and the second display attribute may be different in terms of color, brightness, intensity, etc.

In one embodiment, the processor 610 or 620 may control the display 540 to output light in a portion of the preset biometric sensing region 501 as indicated by indicia 920, and not to output light in a portion of the biometric sensing region 501 as indicated by indicia 910. For example, the processor 610 or 620 may activate pixels included in the region indicated by indicia 920 according to the first display attribute, and may deactivate pixels included in the region indicated by indicia 910 according to the second display attribute. Deactivating a pixel may mean, for example, that the brightness of the pixel is set to zero (0).

When the actual fingerprint 901 is brought into contact with the glass 510, as the actual fingerprint 901 has ridges and valleys in three dimensions (3D), the characteristics of light reflected by portions of the surface of glass 510 coinciding with the ridges and valleys of the fingerprint 901 may be different. For example, at the portion where the ridge of the fingerprint 901 contacts the glass 510, the refraction index of the ridge of the fingerprint 901 may be similar to that of the glass 510, so that a portion of the light output from the display 540 may be absorbed by the finger. At the portion where the valley of the fingerprint 901 contacts the glass 510, as an air layer having a relatively low refractive index exists between the valley of the fingerprint 901 and the surface of the glass 510, a portion of the light output from the display 540 may be refracted and then reflected by the valley toward the biometric sensor 580 as indicated by indicia 923.

On the other hand, 9B, when a 2D counterfeit fingerprint 903 is brought into contact with the glass 510, the counterfeit fingerprint 903 may be in contact with the glass 510 over the entire biometric sensing region 501 (first sub-region 810 and second sub-region 820). Since there is no air layer between the glass 510 and the counterfeit fingerprint 903, unlike when valleys of the actual fingerprint 901 is placed on the glass 510, some of the light output from the display 540 may be not refracted and may be absorbed by or transmitted into the counterfeit fingerprint 903 as indicated by indicia 925. Hence, when the 2D counterfeit fingerprint 903 is brought into contact with the glass 510 as shown in FIG. 9B, the amount of light incident on the biometric sensor 580 disposed in the second sub-region 820 may be different compared with the case of FIG. 9A where the actual fingerprint 901 is brought into contact with the glass 510.

In various embodiments, the processor 610 or 620 of the electronic device 600 can distinguish whether the external object 901 or 903 in contact with the glass 510 is the actual fingerprint 901 or the counterfeit fingerprint 903 by controlling the display 540 so that the first sub-region 810 and the second sub-region 820 emit lights with different properties and analyzing the characteristics of the light sensed at the biometric sensor 580 disposed in the second sub-region 820.

Figure 10:
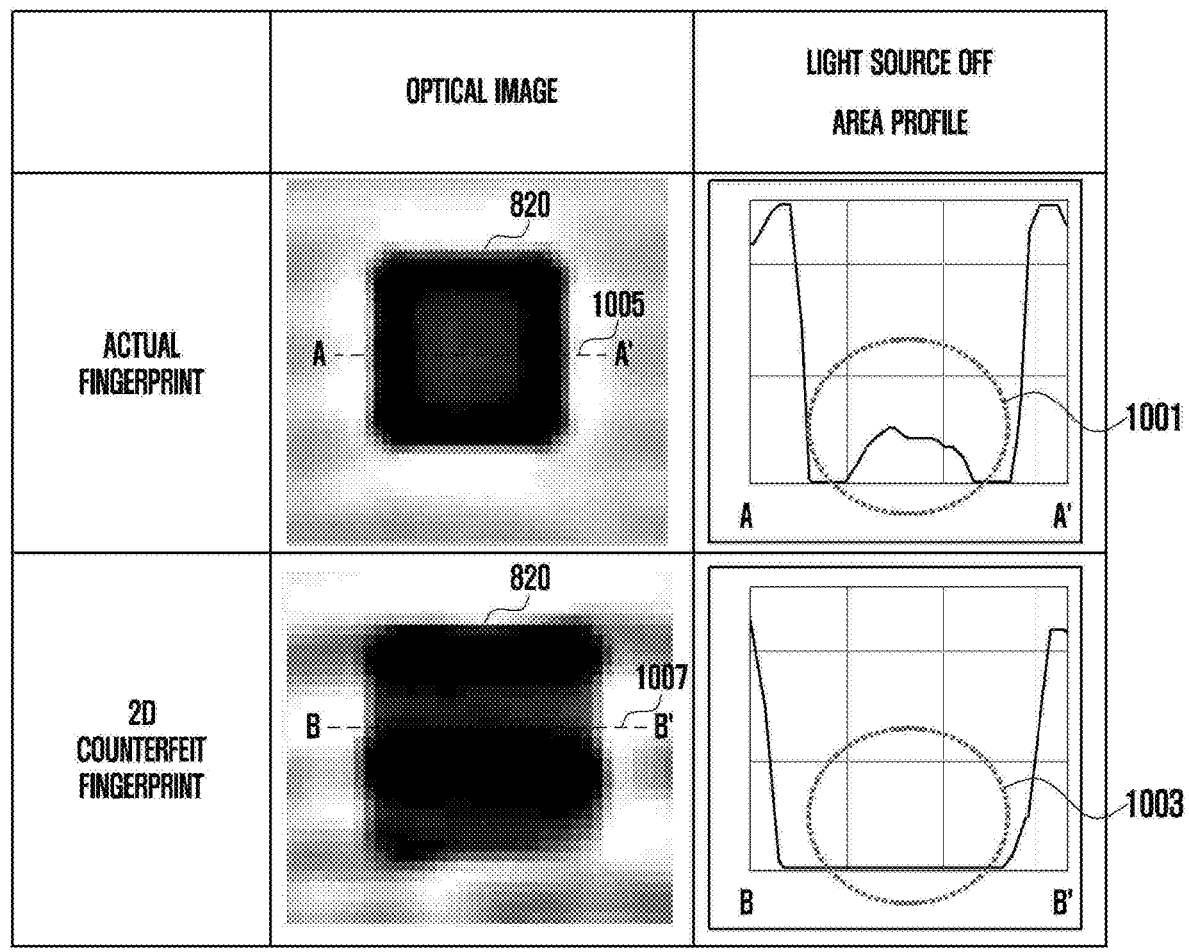
FIG. 10 is optical profiles showing the results of a biometric information recognition experiment using an actual fingerprint and a 2D counterfeit fingerprint.
Figure 11:
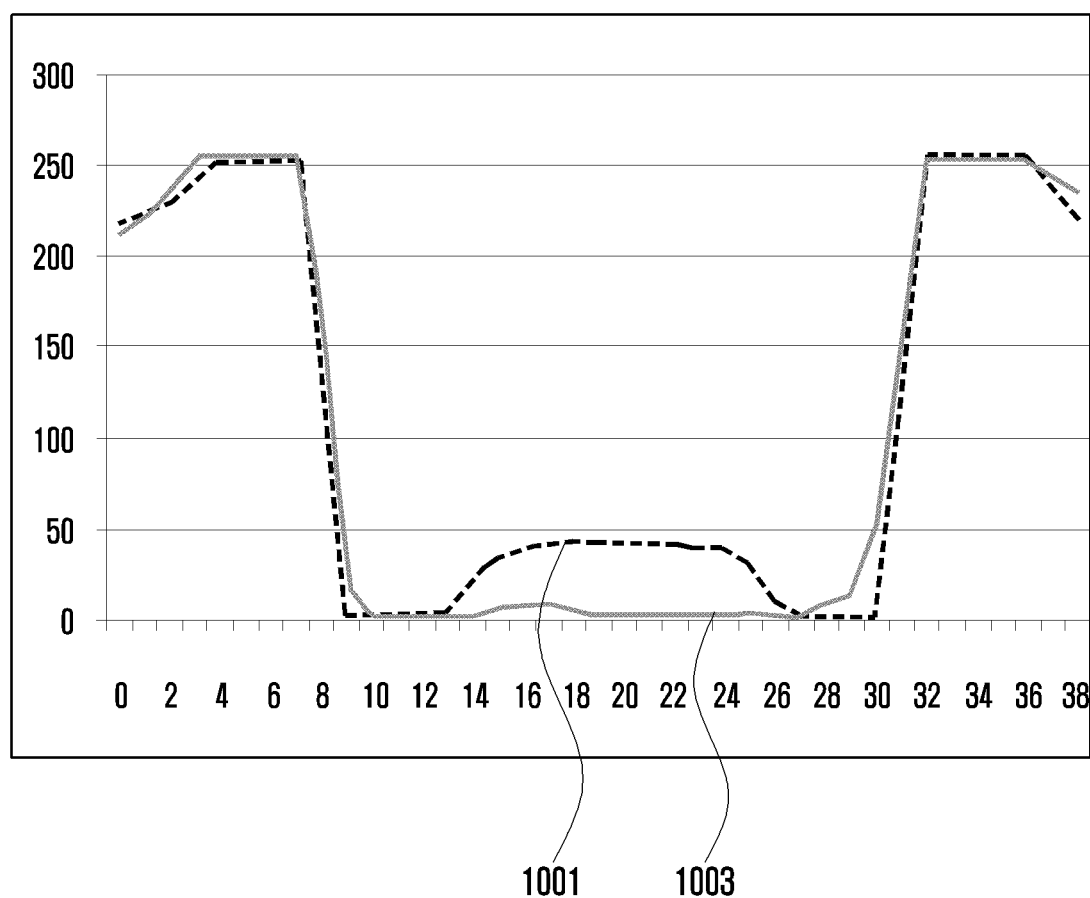
FIG. 11 shows a result of comparison between optical profiles obtained by a biometric sensor for an actual fingerprint and a 2D counterfeit fingerprint.

FIG. 10 is optical profiles showing the results of a biometric information recognition experiment using an actual fingerprint and a 2D counterfeit fingerprint. FIG. 11 shows a result of comparison between optical profiles obtained by a biometric sensor for an actual fingerprint and a 2D counterfeit fingerprint.

With reference to FIG. 10, for the experiment, the first sub-region 810 of the display (e.g. display 540) was set to output cyan colored light, and the pixels of the second sub-region 820 of the display 540 were deactivated. The actual fingerprint 901 and the 2D counterfeit fingerprint 903 were placed on the glass corresponding to the first sub-region 810 and the second sub-region 820, and the light profiles obtained from the biometric sensor 580 disposed in the second sub-region 820 were analyzed. The above experimental conditions are merely an example, and the first display attribute and the second display attribute may be changed in various ways.

It can be seen from FIG. 10 that when the second sub-region 820 is operated according to the second display attribute (e.g. the pixels in the second sub-region 820 were deactivated), the optical image sensed from the biometric sensor 580 is relatively dark in the second sub-region 820. Comparing the cases of the actual fingerprint 901 and the 2D counterfeit fingerprint 903, it can be seen that the light profiles differ in at least the second sub-region 820. For example, the second sub-region 820 is relatively brighter when the actual fingerprint 901 is applied. This difference can be perceived more clearly if the optical image is converted into a light profile along one direction (e.g. horizontal direction) passing through the center of the second sub-region 820 as indicated by indicia 1005 or 1007. For example, when the actual fingerprint 901 is used, a peak in intensity can be detected in the central region as indicated by indicia 1001. However, when the 2D counterfeit fingerprint 903 is used, the peak is not present in the central region as indicated by indicia 1003. Thus, in various embodiments, the processor 610 or 620 of the electronic device 600 can determine whether the external object 901 or 903 is the actual fingerprint 901 by controlling the display 540 so that the first sub-region 810 and the second sub-region 820 emit light with different properties. The processor 610 or 620 can then check whether the light sensed by the biometric sensor 580 includes a peak in intensity as shown in FIG. 11.

However, if attributes of a preset region (e.g. second sub-region 820 of the biometric sensing region 501) are adjusted as disclosed above, i.e. if pixels in the second sub-region 820 are deactivated, failure to detect biometric information may occur when the processor 610 or 620 does not obtain sufficient biometric information from the regions that are illuminated. For example, illuminating the first sub-region 810 alone may not be sufficient to obtain necessary biometric information. To avoid this problem, in various embodiments, the electronic device 600 may arrange the second sub-region 820 in a dummy pixel part located in the border portion of the biometric sensing region 501. For example, the optical biometric sensor 580 may be located at the border portion of the biometric sensing region 501. In one embodiment, the electronic device 600 may drive the optical biometric sensor 580 at least two times to allow the biometric sensor 580 to capture plural images (e.g. plural fingerprint images). In doing so, during one out of the at least two times, the electronic device 600 may adjust the light outputted from the second sub-region 820 (e.g. deactivate the pixels in the second sub-region 820) to determine whether the external object 901 or 903 is a falsified fingerprint. For example, during the first time of fingerprint image capture, the processor 610 or 620 may drive the display 540 so that the first sub-region 810 and the second sub-region 820 have the same attributes, so that the biometric sensor 580 acquires a first image corresponding to the external object 901 or 903. During the second time of fingerprint image capture, the processor 610 or 620 may drive the display 540 while deactivating the second sub-region 820, so that the biometric sensor 580 acquires a second image corresponding to the external object 901 or 903. Determination of whether the external object 901 or 903 is a forged fingerprint may be done using the second image. Alternatively, the second sub-region 820 may be deactivated during the first time of fingerprint image capture.

Figure 12A:
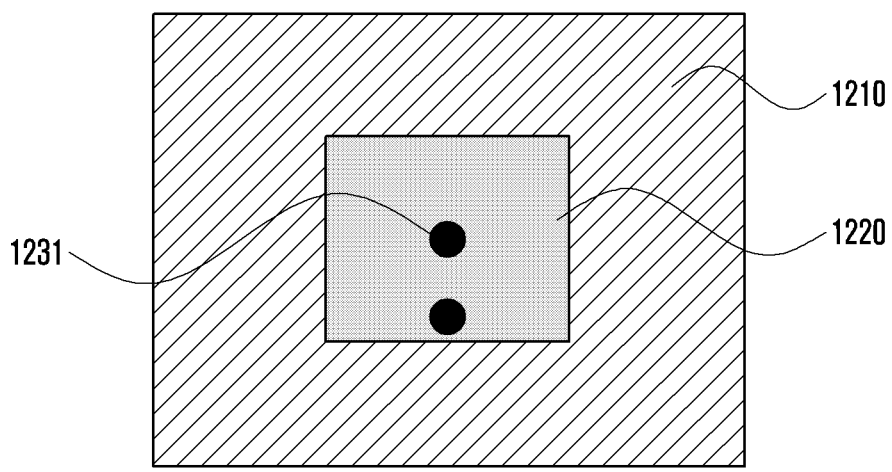
FIG. 12A, FIG. 12B and FIG. 12C are diagrams illustrating various biometric sensors according to various embodiments of the present disclosure.
Figure 12B:
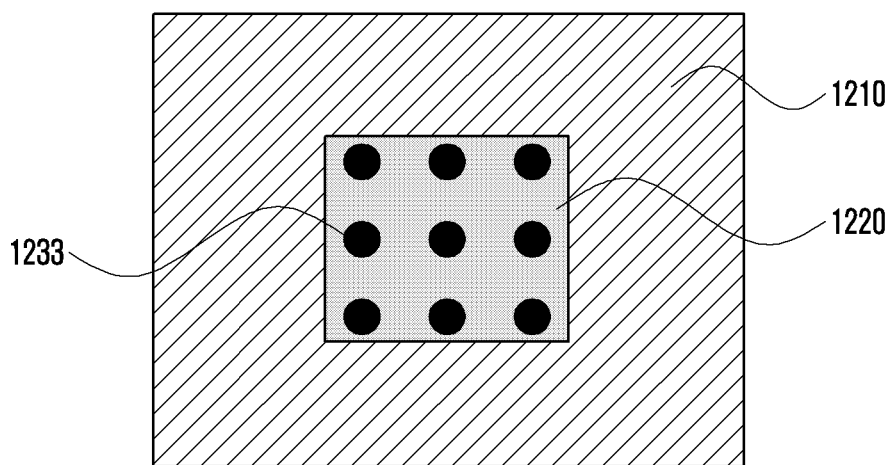
Figure 12C:
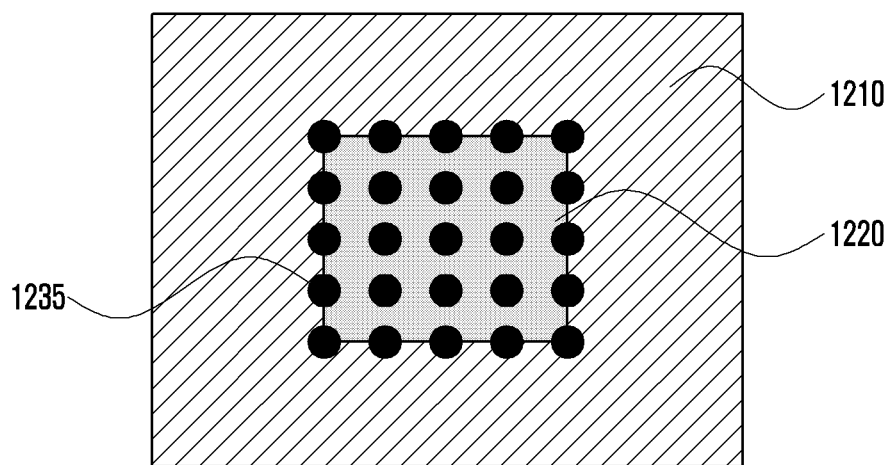

FIGS. 12A to 12C are diagrams illustrating various biometric sensors according to various embodiments of the present disclosure.

With reference to FIGS. 12A to 12C, in various embodiments, determination of whether the external object 901 or 903 is a forged fingerprint may be done by altering the properties of the second sub-region 1220 (e.g. second sub-region 820) as described above in relation to the experiment of FIG. 10. For example, when operating the display 540 to output light for biometric information recognition, the processor 610 or 620 may be configured to control the display 540 so that the second sub-region 1220 has different attributes from those of the first sub-region 1210 (e.g. first sub-region 810) and analyze the signals sensed by the biometric sensor 580 corresponding to two or more pixels in the second sub-region 1220. As shown in FIG. 12A, the processor 610 or 620 may analyze a signal obtained from the biometric sensor 580 corresponding to two different pixels 1231 located in the second sub-region 1220. As shown in FIG. 12B, the processor 610 or 620 may analyze a signal obtained from the biometric sensor 580 corresponding to nine pixels 1233 located in the second sub-region 1220. As shown in FIG. 12C, the processor 610 or 620 may analyze a signal obtained from the biometric sensor 580 corresponding to twenty-five pixels 1235 located in the second sub-region 1220.

In one embodiment, the processor 610 or 620 may perform a weighted sum operation on the signal obtained from the biometric sensor 580 corresponding to two or more pixels. For example, the processor 610 or 620 may assign a relatively high weight to a first signal corresponding to a first pixel located at the central portion of the second sub-region 1220, and assign a relatively low weight to a second signal corresponding to a second pixel located at the border portion of the second sub-region 1220. After summing the weighted signals, the processor 610 or 620 may determine whether the result of the weighted sum exceeds a preset threshold. If the result exceeds the threshold, the processor 610 or 620 may determine that the external object 901 or 903 is the actual fingerprint 901 because exceeding the threshold indicates that a peak in intensity, as shown in FIG. 10, is present in the second sub-region 1220. If the result is below the threshold, the processor 610 or 620 may determine that the external object 901 or 903 is the counterfeit fingerprint 903 because that indicates that the peak is not present in the second sub-region 1220.

Figure 13A:
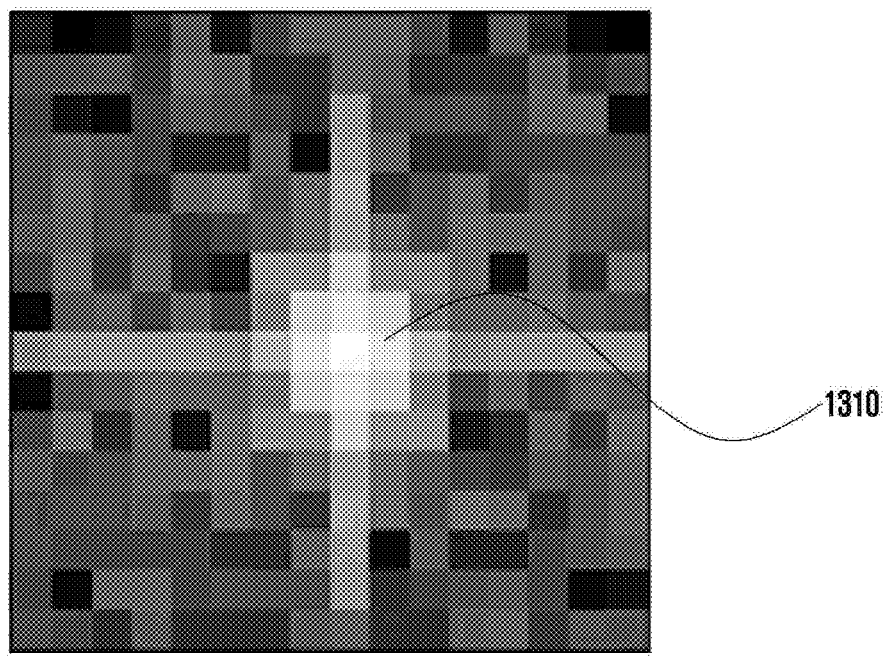
FIG. 13A and FIG. 13B are illustrations showing 2-dimensional fast Fourier transforms of signals sensed by a biometric sensor according to an embodiment of the present disclosure.
Figure 13B:
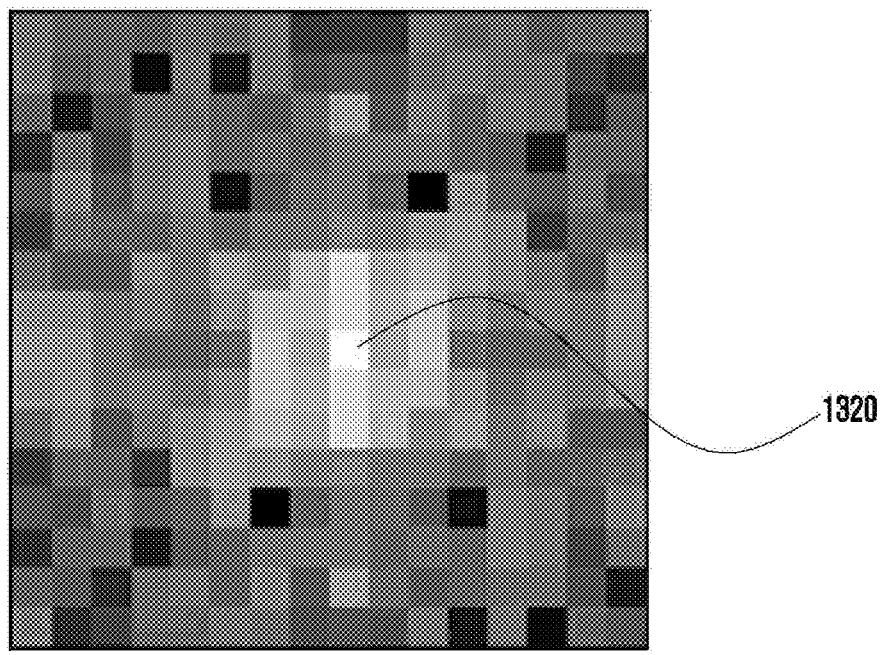

FIGS. 13A and 13B are illustrations showing 2-dimensional fast Fourier transforms of signals sensed by a biometric sensor according to an embodiment of the present disclosure.

With reference to FIGS. 13A and 13B, as explained above, in operating the display 540 to output light for biometric information recognition, the processor (e.g. first processor 610 or second processor 620) may control the display 540 so that the second sub-region 820 has different attributes from those of the first sub-region 810. The processor may also apply 2D FFT (2-dimensional fast Fourier transform) to the signals sensed by the biometric sensor 580, when the biometric sensor 580 corresponds to two or more pixels included in the second sub-region 820. The processor may then determine whether the external object 901 or 903 is falsified by analyzing the distribution of the high frequency components of the signal.

According to an experiment, when the external object 901 or 903 was the actual fingerprint 901, the result of 2D-FFT was as shown in FIG. 13A. When the external object 901 or 903 was the counterfeit fingerprint 903, the result of 2D-FFT was as shown in FIG. 13B. As it can be seen from reference numeral 1310 of FIG. 13A and reference numeral 1320 of FIG. 13B, the distributions of high frequency components are different. Hence, in various embodiments, the electronic device 600 may determine whether the external object 901 or 903 is falsified by examining the distribution of high frequency components in the 2D FFT. For example, the processor 610 or 620 may determine the second display attribute for the second sub-region 820 of the display 540 and retrieve from memory (e.g. the memory 730) the distribution of high frequency components corresponding to the second display attribute. The processor 610 or 620 may apply 2D-FFT to the signal obtained from the biometric sensor 580 located in the second sub-region 820 to calculate the distribution of high frequency components, and compare the calculated distribution of high frequency components in the 2D-FFT to the distribution retrieved from memory to determine whether they are identical or similar. If the calculated distribution is identical or similar to the distribution in memory, the processor 610 or 620 may determine that the external object 901 or 903 is the actual fingerprint 901. Otherwise, the processor 610 or 620 may determine that the external object 901 or 903 is the counterfeit fingerprint 903.

In the above description with reference to FIG. 12 to FIG. 13, since additional signal processing is required to determine whether the external object 901 or 903 is falsified, user authentication using biometric information may take longer. In various embodiments, to solve this problem, the electronic device 600 may apply an adaptive procedure based on the current state or the security level of the application running in the electronic device. For example, when the electronic device 600 is currently providing a payment service which requires a relatively high security level, the processor 610 or 620 may be configured to determine whether the external object 901 or 903 is falsified, even if such determination requires additional time and would cause delays in user authentication. On the other hand, when the electronic device 600 receives an unlock request from the user, the processor 610 or 620 may regard this operation as corresponding to a relatively low security level, and thus the operation of determining whether the external object 901 or 903 is falsified may be skipped.

In one embodiment, in the electronic device 600, the fingerprint recognition function may be carried out in a separate security zone so-called trust zone (TZ), and only single-core and single-thread processing may be allowed in the TZ depending on the implementation. In various embodiments, when the above-described procedure is applied to perform the fingerprint recognition function, an additional authentication time delay may occur. Hence, the electronic device 600 may assign the task of determining whether the external object 901 or 903 is falsified to the main processor 610 or 620 or the sensor module. For example, the electronic device 600 may execute the algorithm for determining whether the external object 901 or 903 is falsified through the main processor 610 or 620 or the sensor module, and execute the algorithm for matching and authentication of the external object 901 or 903 through the TZ in parallel.

FIGS. 14A to 14F illustrate various light output schemes of the display for biometric information recognition according to various embodiments.

With reference to FIGS. 14A to 14F, the processor (e.g. first processor 610 or second processor 620) may control, for example, the display 540 to output light for biometric information recognition in various ways.

Figure 14A:
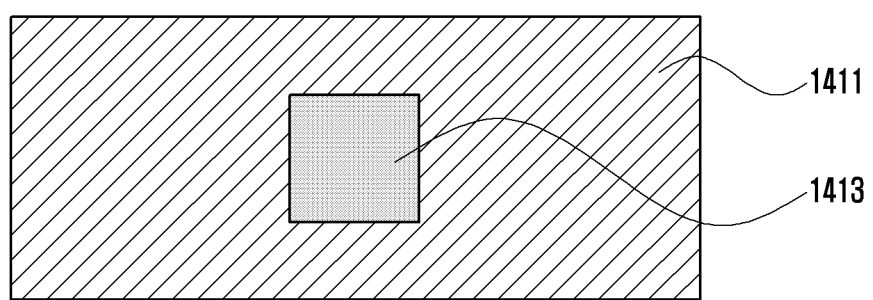
FIG. 14A, FIG. 14B, FIG. 14C, FIG. 14D, FIG. 14E and FIG. 14F illustrate various light output schemes of the display for biometric information recognition according to various embodiments.

As shown in FIG. 14A, the processor 610 or 620 may control the display 540 to output light in the biometric sensing region 501, which is a predesignated region for sensing biometric information. The processor 610 or 620 may set the middle region of the biometric sensing region 501 as the second sub-region 1413 (e.g. the second sub-region 820), and control the second sub-region 1413 to emit light with an attribute different from that of the light emitted from the first sub-region 1411 (e.g. the first sub-region 810). For example, the processor 610 or 620 may deactivate the pixels included in the second sub-region 1413 so that they do not output light.

Figure 14B:
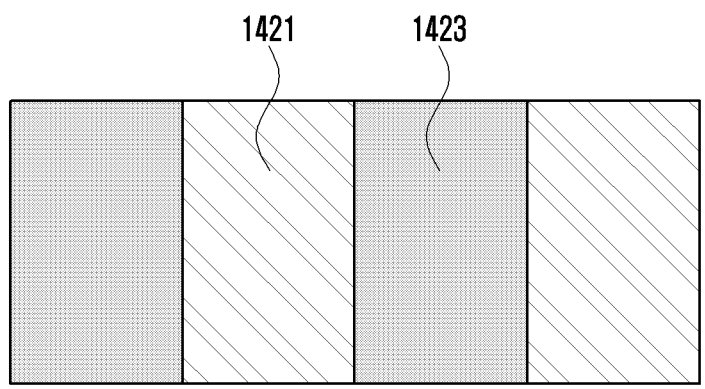

As shown in FIG. 14B, the processor 610 or 620 may divide the biometric sensing region 501 into the striped first sub-region 1421 and second sub-region 1423, and control the first sub-region 1421 to output light according to the first display attribute and the second sub-region 1423 to output light according to the second display attribute different from the first display attribute.

Figure 14C:
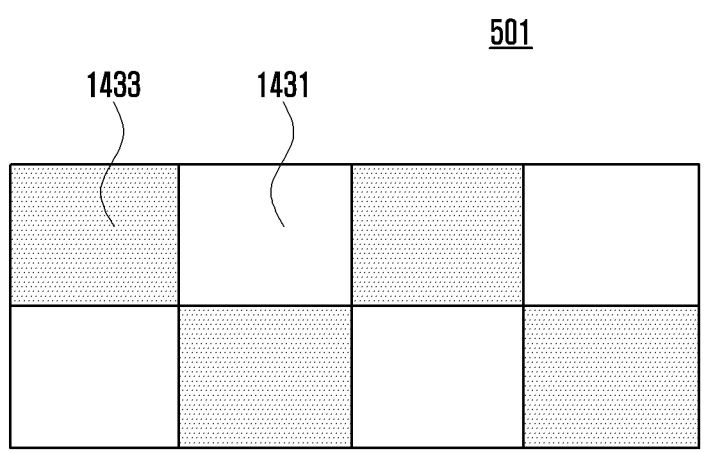

As shown in FIG. 14C, the processor 610 or 620 may divide the biometric sensing region 501 into the first sub-region 1431 and the second sub-region 1433 in a matrix or chessboard pattern, and control the display 540 so that the first sub-region 1431 outputs light according to the first display attribute and the second sub-region 1433 outputs light according to the second display attribute different from the first display attribute.

Figure 14D:
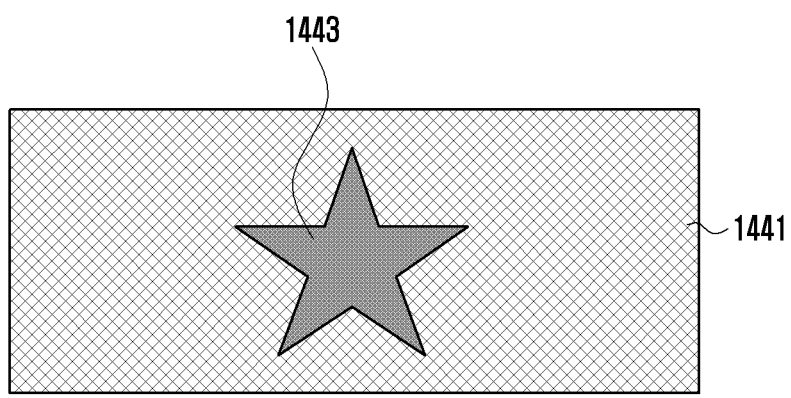

As shown in FIG. 14D, the processor 610 or 620 may designate the middle region of the biometric sensing region 501 as the second sub-region 1443 so that the second sub-region 1443 has a specific shape, such as a star shape, and adjust the second sub-region 1443 so that it outputs light with an attribute different from that of the light output from the first sub-region 1441.

Figure 14E:
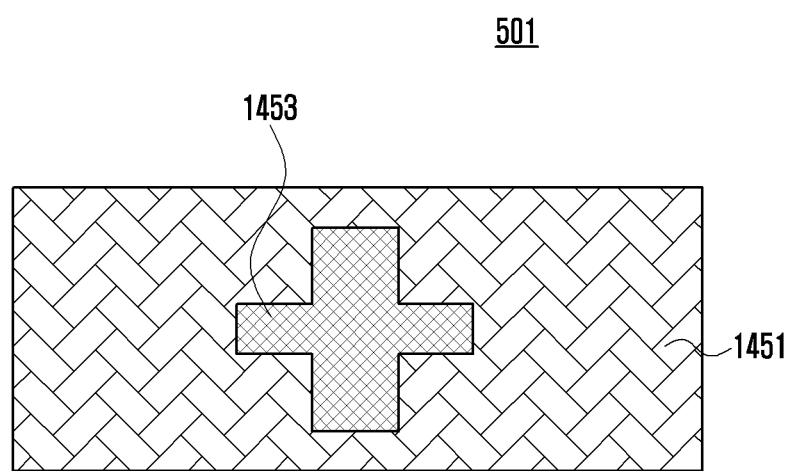

As shown in FIG. 14E, the processor 610 or 620 may designate the middle region of the biometric sensing region 501 as the second sub-region 1453 so that the second sub-region 1453 has a specific shape, such as a cross shape, and adjust the second sub-region 1453 so that it outputs light with an attribute different from that of the light output from the first sub-region 1451.

Figure 14F:
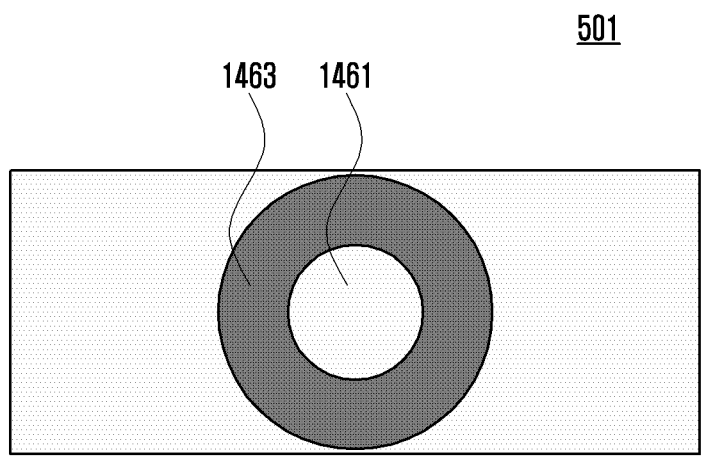

As shown in FIG. 14F, the processor 610 or 620 may designate the second sub-region 1463 to have a donut shape with an opening in the middle, and adjust the second sub-region 1463 so that it outputs light with an attribute different from that of the light output from the first sub-region 1461. In one embodiment, like the remaining first sub-region 1461, the middle open portion of the second sub-region 1463 may output light according to the first display attribute different from the second display attribute of the second sub-region 1463.

In one embodiment, the processor 610 or 620 may change the shape and size of the first sub-region 1411, 1421, 1431, 1441, 1451 or 1461 and the second sub-region 1413, 1423, 1433, 1443, 1453 or 1463 according to at least one condition. For example, when the biometric sensing region 501 partitioned into stripes as shown in FIG. 14B, if the signal obtained from the biometric sensor 580 is less than a preset reference signal, the processor 610 or 620 may change the shape of the biometric sensing region 501 so that obtained signal can exceed the preset reference signal. This may be done by reducing the area of the second sub-region 1413, 1423, 1433, 1443, 1453 or 1463. In one embodiment, the processor 610 or 620 may determine the area of the external object 901 or 903 based on the signal obtained through at least a portion of the biometric sensing region 501, and may change the shape or size of the first sub-region 1411, 1421, 1431, 1441, 1451 or 1461 or the second sub-region 1413, 1423, 1433, 1443, 1453 or 1463 based on the determined area. In one embodiment, the electronic device may change the position or size of the second sub-region 1413, 1423, 1433, 1443, 1453 or 1463 based on the position of the external object 901 or 903. In various embodiments, the electronic device 600 may be configured to store, in the memory, optical profile data of the actual fingerprint 901 experimentally obtained using various second sub-regions, such as the sub-region 1413, 1423, 1433, 1443, 1453 or 1463. The electronic device 600 may then determine whether the external object 901 or 903 is falsified by comparing the profile of the external object to the stored data.

Figure 15:
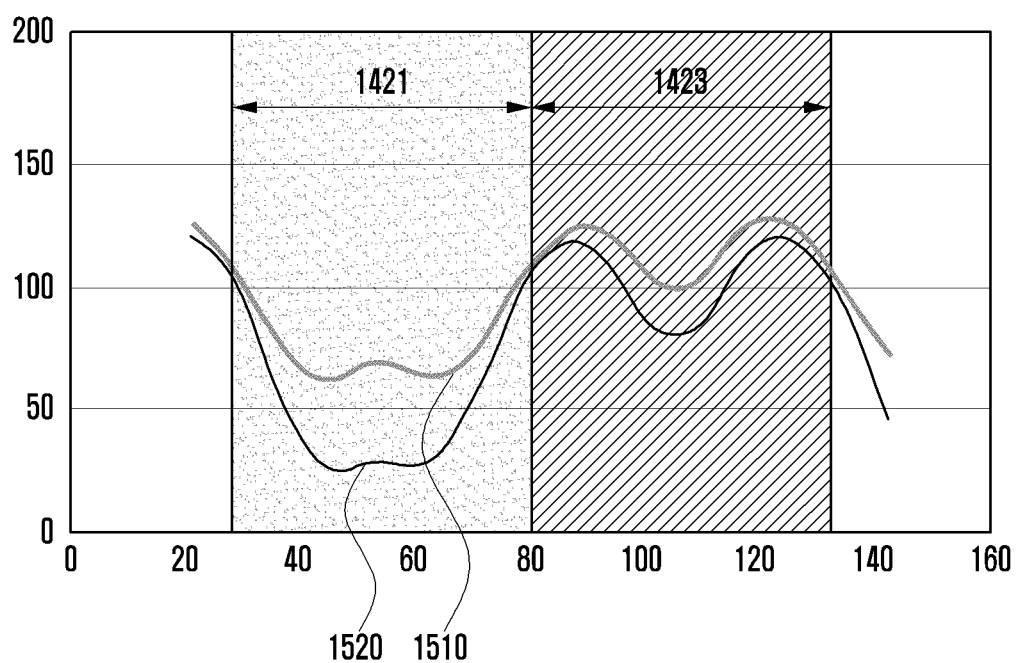
FIG. 15 is a graph of optical profiles obtained by the biometric sensor when the display is used as a light source and when the display is partitioned into stripes as shown in FIG. 14B.

FIG. 15 is a graph of optical profiles obtained by the biometric sensor when the display is used as a light source and when the display is partitioned into stripes as shown in FIG. 14B. In FIG. 15, reference numeral 1520 indicates an optical profile associated with a 2D counterfeit fingerprint 903, and reference numeral 1510 indicates an optical profile associated an actual fingerprint 901.

It can be seen from FIG. 15 that when the biometric sensing region 501 is divided into stripes, the light profiles measured respectively in the first sub-region 1421 and the second sub-region 1423 vary depending on whether the input fingerprint is falsified.

According to various embodiments of the present disclosure, an operation method for the electronic device including a biometric sensor and a display having a biometric sensing region may include: operating a first sub-region of the biometric sensing region according to a first display attribute and operating a second sub-region of the biometric sensing region according to a second display attribute; while the first sub-region is operated according to the first display attribute and the second sub-region is operated according to the second display attribute, obtaining, through the biometric sensor, a signal corresponding to an external object, wherein the signal is generated at least partially based on light that is emitted from the first sub-region or the second sub-region and reflected by the external object; performing authentication on the external object if the signal satisfies a specified condition; and preventing authentication on the external object if the signal does not satisfy the specified condition. Operating the first sub-region according to the first display attribute and operating the second sub-region according to the second display attribute may further include adjusting brightness, color, or grayscale of the display or a voltage applied to the display. Operating the first sub-region according to the first display attribute and operating the second sub-region according to the second display attribute may further include activating at least one pixel included in the first sub-region and deactivating at least one pixel included in the second sub-region. The signal may include information obtained via a portion of the biometric sensor corresponding to the second sub-region. The method may further include determining that the specified condition is satisfied if a portion of the signal corresponds to a designated frequency and determining that the specified condition is not satisfied if the portion of the signal does not correspond to the designated frequency. The method may further include: selecting a first portion of the signal corresponding to a first pixel included in the second sub-region of the display and selecting a second portion of the signal corresponding to a second pixel included in the second sub-region; assigning a first weight to the first portion and assign a second weight to the second portion; and determining whether the specified condition is satisfied at least partially based on the first portion weighted with the first weight and the second portion weighted with the second weight. The method may further include: controlling, during a first time of biometric information capture, the display so that the first sub-region and the second sub-region output light according to the first display attribute; and controlling, during a second time of biometric information capture, the display so that the first sub-region outputs light according to the first display attribute and the second sub-region outputs light according to the second display attribute. The method may further include periodically changing the first display attribute and the second display attribute.

Figure 16:
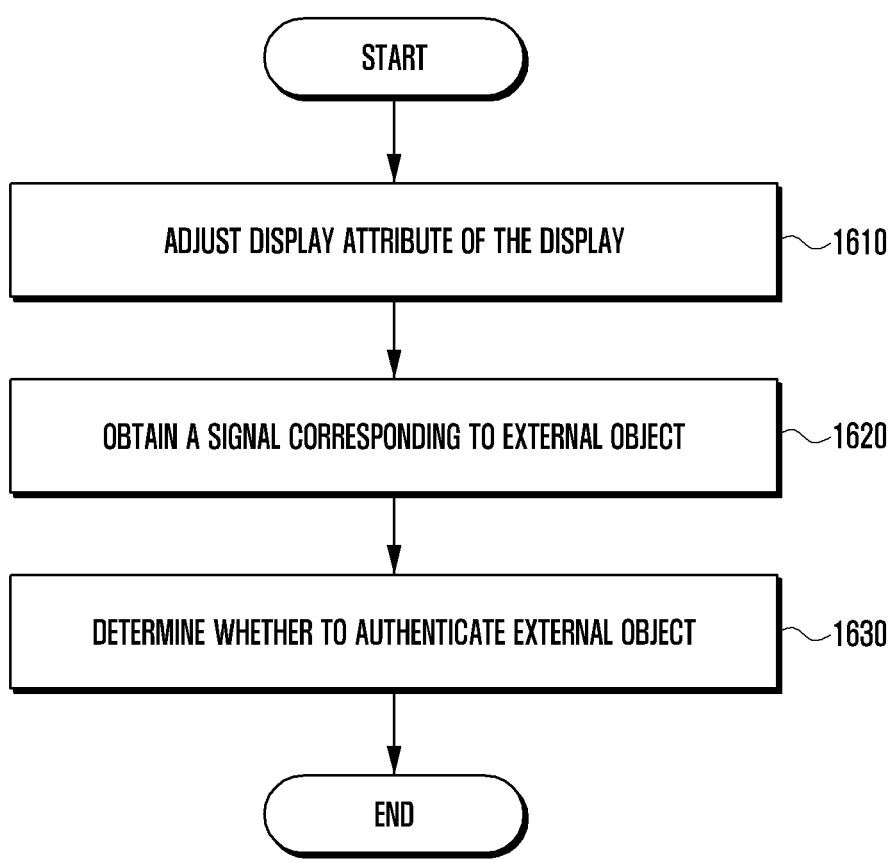
FIG. 16 is a flowchart illustrating operations of an electronic device according to an embodiment of the present disclosure.

FIG. 16 is a flowchart illustrating operations of an electronic device according to an embodiment of the present disclosure.

At operation 1610, the processor (e.g. first processor 610 or second processor 620) of the electronic device (e.g. electronic device 600) may adjust the display attributes of the display (e.g. the display 540). For example, the processor 610 or 620 may sense biometric information of the user via the biometric sensor (e.g. the biometric sensor 580). The processor 610 or 620 may control at least some of the display to output light and to serve as a light source for the biometric sensor. The processor 610 or 620 may then sense biometric information by driving the optical biometric sensor 580. For example, among the designated region of the display 540, the processor 610 or 620 may set the first sub-region 810 to a first display attribute and set at least a portion of the second sub-region 820 different from the first sub-region 810 to a second display attribute. That is, the processor 610 or 620 may control the first sub-region 810 of the display 540 to output light corresponding to the first display attribute, and control the second sub-region 820 of the display 540 to output light corresponding to the second display attribute. The first display attribute and the second display attribute may be different in terms of color, brightness, intensity, etc. In one embodiment, as part of setting the first display attribute and the second display attribute, the processor 610 or 620 may adjust the brightness, color, or grayscale of the display 540 and at least one voltage applied to the display 540. In one embodiment, the processor 610 or 620 may activate pixels included in the first sub-region 810 of the display 540 according to the first display attribute, and may deactivate pixels included in the second sub-region 820 of the display 540 according to the second display attribute. Deactivating a pixel may indicate, for example, that the brightness of the pixel is set to zero (0).

At operation 1620, the processor 610 or 620 of the electronic device 600 may obtain a signal corresponding to an external object (e.g. the external object 901 or 903) via the biometric sensor 580. For example, the processor 610 or 620 may receive, through the biometric sensor 580, a signal corresponding to the light that is output from at least some region of the display 540 and then reflected by the external object 901 or 903. In one embodiment, the processor 610 or 620 may set information obtained via the biometric sensor 580 corresponding to the second sub-region 820 of the display 540 as a reference signal.

At operation 1630, the processor 610 or 620 may check whether the reference signal meets a preset condition and determine whether the obtained biometric information is falsified based on the result of the check. For example, if the reference signal satisfies a first specified condition, the processor 610 or 620 may determine that the obtained biometric information is not falsified. If the reference signal satisfies a second specified condition, the processor 610 or 620 may determine that the obtained biometric information is falsified. The first specified condition and the second specified condition may be set based on whether the reference signal includes a high frequency component. For example, the processor 610 or 620 may determine that the first specified condition is satisfied when the reference signal includes a high frequency component above a threshold, and may determine that the second specified condition is satisfied when the reference signal does not include the high frequency component above the threshold.

In one embodiment, the processor 610 or 620 of the electronic device 600 may perform a specified function according to whether the obtained biometric information is falsified. For example, if the obtained biometric information is falsified, the processor 610 or 620 may stop user authentication and output a user interface notifying authentication failure through the display 540. If the obtained biometric information is not falsified, the processor 610 or 620 may confirm the identity of the user. For example, if the reference signal satisfies the first specified condition, the processor 610 or 620 may be configured to authenticate the user. On the other hand, if the reference signal satisfies the second specified condition, the processor 610 or 620 may be configured to prevent authentication.

Figure 17:
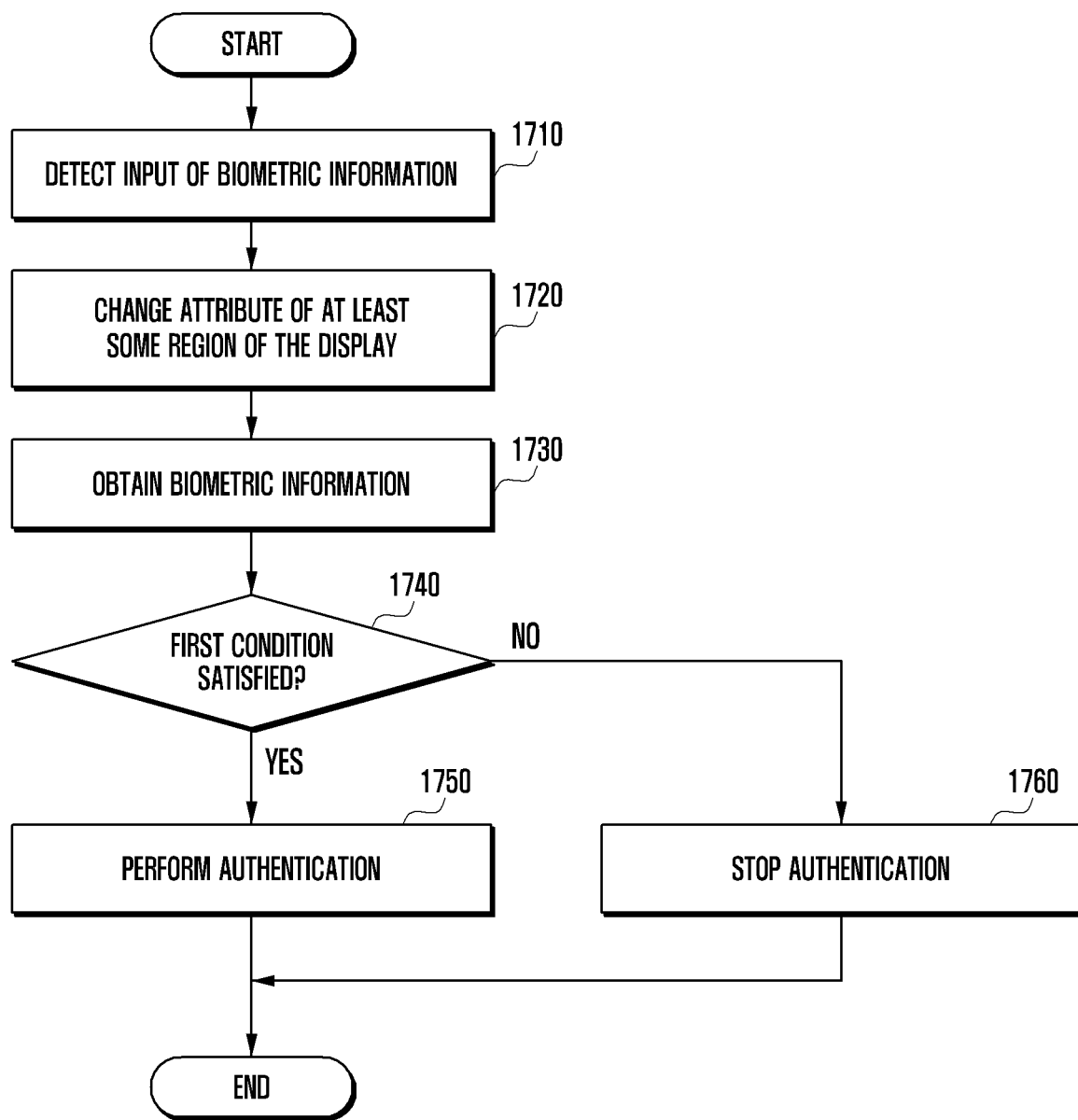
FIG. 17 is a flowchart illustrating more detailed operations of an electronic device according to an embodiment of the present disclosure.

FIG. 17 is a flowchart illustrating more detailed operations of an electronic device according to an embodiment of the present disclosure.

At operation 1710, the processor (e.g. first processor 610 or second processor 620) of the electronic device (e.g. electronic device 600) may detect input of biometric information. The processor 610 or 620 may identify that it is in a state of sensing biometric information by identifying a particular application that is currently running or by identifying that a particular input has been detected. For example, when a specific application (e.g. application related to a financial service) is executed, the processor 610 or 620 may provide an interface requesting user authentication through the display (e.g. 540) and control the biometric sensor 580 to detect input of biometric information. Or, when a preset key is input or a preset touch is detected on the screen area of the display 540 while the electronic device 600 is in the locked or sleep state, the processor 610 or 620 may provide a user interface requesting user authentication through the display 540 and control the biometric sensor 580 to detect input of biometric information. In an embodiment, the above user interfaces may be provided for a predetermined amount of time.

At operation 1720, the processor 610 or 620 may change the attribute of at least some region of the display 540. For example, the processor 610 or 620 may control the display 540 to output light in a portion of the biometric sensing region 501 and not to output light in another portion of the biometric sensing region 501. Here, controlling the display 540 not to output light in a portion of the biometric sensing region 501 may enable the processor 610 or 620 to identify whether the input biometric information is falsified. For example, among the designated region of the display 540, the processor 610 or 620 may set the first sub-region 810 to a first display attribute and set at least a portion of the second sub-region 820 different from the first sub-region 810 to a second display attribute. That is, the processor 610 or 620 may control the first sub-region 810 of the display 540 to output light corresponding to the first display attribute, and control the second sub-region 820 of the display 540 to output light corresponding to the second display attribute. The first display attribute and the second display attribute may be different in terms of color, brightness, intensity, etc. The processor 610 or 620 may be configured to periodically change the first display attribute and the second display attribute. For example, the processor 610 or 620 may change the first display attribute and the second display attribute after every time user authentication is performed via the biometric sensor 580. That is, the electronic device 600 may further enhance security by changing the first display attribute and the second display attribute after every time user authentication is performed through the biometric sensor 580.

At operation 1730, the processor 610 or 620 may obtain biometric information via the biometric sensor 580 based on the light outputted from at least some region of the display 540. For example, the processor 610 or 620 may receive, through the biometric sensor 580, a signal corresponding to the light that is outputted from at least some region of the display 540 and then reflected by the external object 901 or 903. In one embodiment, the processor 610 or 620 may set information obtained via the biometric sensor 580 corresponding to the second sub-region 820 of the display 540 as a reference signal.

At operation 1740, the processor 610 or 620 may determine whether the signal obtained via the biometric sensor 580 satisfies a first specified condition. For example, the processor 610 or 620 may determine whether the reference signal acquired via the biometric sensor 580 corresponding to the second sub-region 820 meets the first specified condition. Specifically, the processor 610 or 620 may determine that the first specified condition is satisfied when the reference signal includes a high frequency component above a threshold, and may determine that the first specified condition is not satisfied when the reference signal does not include the high frequency component above the threshold. If the first specified condition is satisfied, the procedure proceeds to operation 1750. If the first specified condition is not satisfied, the procedure proceeds to operation 1760.

At operation 1750, the processor 610 or 620 may authenticate the external object 901 or 903. For example, the processor 610 or 620 may determine whether the signal obtained from the biometric information matches the biometric information stored in memory, and may perform user authentication based on the determination result. In one embodiment, based on the result of user authentication, the processor 610 or 620 may output a user interface indicating the authentication result on the display 540.

At operation 1760, the processor 610 or 620 may stop authentication on the external object 901 or 903. For example, the processor 610 or 620 may not determine whether the signal obtained from the biometric information matches the biometric information stored in memory. The processor 610 or 620 may also cause the display 540 to output a user interface indicating authentication failure. Here, the user interface indicating authentication failure may include, for example, a notification that "the input biometric information is falsified."

As described above, various embodiments of the present disclosure can enhance security for electronic devices by accurately identifying falsified biometric information (e.g. fake fingerprint). Such identification may be done by controlling the light source of the biometric sensor according to methods disclosed herein.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device comprising:
a display;
a biometric sensor disposed under the display; and
a processor configured to:
in response to a user input, control a first portion of the display to output light corresponding to a first color and a second portion of the display to output light corresponding to a second color;
while the first portion of the display is outputting light corresponding to the first color and the second portion of the display is outputting light corresponding to the second color, obtain, via the biometric sensor, biometric information of an external object based on light reflected by the external object out of light that is outputted from the first portion and the second portion of the display; and
perform authentication on the external object based on the biometric information.

2. The electronic device of claim 1, wherein the biometric sensor comprises a fingerprint sensor.

3. The electronic device of claim 1, wherein the processor is configured to, while the first portion and the second portion of the display are outputting light of the first color and light of the second color, control a remaining portion of the display not to output any light.

4. The electronic device of claim 1, wherein the first portion is adjacent to the second portion.

5. The electronic device of claim 1, wherein each of the first portion and the second portion has a circular shape.

6. The electronic device of claim 5, wherein the second portion surrounds an outer periphery of the first portion.

7. The electronic device of claim 1, wherein the processor is configured to:
based on light reflected by the external object out of light of the first color that is outputted from the first portion of the display and light of the second color that is outputted from the second portion of the display, determine that the external object corresponds to a finger having three-dimensional features, and perform authentication on the external object.

8. The electronic device of claim 1, wherein the processor is configured to:
determine whether the external object is a three-dimensional object or a two-dimensional object based on the biometric information.

9. The electronic device of claim 8, wherein the processor is configured to:
when the biometric information satisfies a specified condition, determine that the external object is the three-dimensional object, and perform authentication on the external object, and when the biometric information does not satisfy the specified condition, determine that the external object is the two-dimensional object, and stop authentication on the external object.

10. A method of operation for an electronic device comprising a display, and a biometric sensor disposed under the display, the method comprising:

in response to a user input, controlling a first portion of the display to output light corresponding to a first color and a second portion of the display to output light corresponding to a second color;

while the first portion of the display is outputting light corresponding to the first color and the second portion of the display is outputting light corresponding to the second color, obtaining, via the biometric sensor, biometric information of an external object based on light reflected by the external object out of light that is outputted from the first portion and the second portion of the display; and performing authentication on the external object based on the biometric information.

11. The method of claim 10, wherein the biometric sensor comprises a fingerprint sensor.

12. The method of claim 10, further comprising, while the first portion and the second portion of the display are outputting light of the first color and light of the second color, controlling a remaining portion of the display not to output any light.

13. The method of claim 10, wherein the first portion is adjacent to the second portion.

14. The method of claim 10, wherein the first portion and the second portion have a circular shape.

15. The method of claim 14, wherein the second portion surrounds an outer periphery of the first portion.

16. The method of claim 10, further comprising, based on light reflected by the external object out of light of the first color that is outputted from the first portion of the display and light of the second color that is outputted from the second portion of the display, determining that the external object corresponds to a finger having three-dimensional features, and performing authentication on the external object.

17. The method of claim 10, wherein the performing authentication on the external object comprises:

determining whether the external object is a three-dimensional object or a two-dimensional object based on the biometric information.

18. The method of claim 17, wherein the performing authentication on the external object comprises:

when the biometric information satisfies a specified condition, determining that the external object is the three-dimensional object, and performing authentication on the external object, and when the biometric information does not satisfy the specified condition, determining that the external object is the two-dimensional object, and stopping authentication on the external object.

19. A non-transitory computer-readable recording medium storing a program for controlling operations of an electronic device comprising a display, and a biometric sensor disposed under the display, wherein the program is configured to cause the electronic device to:

in response to a user input, control a first portion of the display to output light corresponding to a first color and a second portion of the display to output light corresponding to a second color;

while the first portion of the display is outputting light corresponding to the first color and the second portion of the display is outputting light corresponding to the second color, obtain, via the biometric sensor, biometric information of an external object based on light reflected by the external object out of light that is outputted from the first portion and the second portion of the display; and perform authentication on the external object based on the biometric information.

20. The non-transitory computer-readable recording medium of claim 19, wherein the first portion and the second portion have a circular shape, and the second portion surrounds an outer periphery of the first portion.

* * * * *